US012603428B2

(12) United States Patent
Goh et al.

(10) Patent No.: US 12,603,428 B2
(45) Date of Patent: Apr. 14, 2026

(54) INFORMATION HANDLING SYSTEM DONGLE WITH ORTHOGONAL RADIATING ANTENNA PLANES

(71) Applicant: Dell Products L.P., Round Rock, TX (US)

(72) Inventors: Peng Lip Goh, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 76 days.

(21) Appl. No.: 18/676,750

(22) Filed: May 29, 2024

(65) Prior Publication Data

US 2025/0372869 A1 Dec. 4, 2025

(51) Int. Cl.

*H01Q 3/24* (2006.01)
*H01Q 1/08* (2006.01)
*H01Q 1/22* (2006.01)
*H01Q 1/42* (2006.01)

(52) U.S. Cl.

CPC ............... *H01Q 3/24* (2013.01); *H01Q 1/085* (2013.01); *H01Q 1/2275* (2013.01); *H01Q 1/42* (2013.01)

(58) Field of Classification Search

CPC ........... H01Q 1/2275; H01Q 1/42; H01Q 3/24
See application file for complete search history.

(56) References Cited

U.S. PATENT DOCUMENTS 5,913,174 A 6/1999 Casarez
6,305,984 B1 10/2001 Katoh
6,538,606 B2 3/2003 Quinn
7,382,760 B2 6/2008 Slamka et al.
7,397,434 B2 7/2008 Mun et al.
7,532,872 B2 5/2009 Lazzarotto et al.
7,538,731 B2 5/2009 Wong
7,864,157 B1 * 1/2011 Wright .................... G06F 3/038 345/158
8,478,913 B2 7/2013 Terlizzi et al.
8,904,021 B2 12/2014 Harrison
9,201,559 B2 12/2015 Piot et al.
10,275,370 B2 4/2019 Perez
10,299,326 B2 5/2019 Thompsen
10,409,751 B2 9/2019 Grobelny et al.
10,783,757 B2 9/2020 Siminoff
11,364,433 B2 6/2022 Wolff-Petersen et al.
11,442,559 B2 9/2022 Morier et al.
2001/0052879 A1 12/2001 Gunee
2004/0181695 A1 9/2004 Walker
(Continued)

*Primary Examiner* — Zachary K Huson

(74) *Attorney, Agent, or Firm* — Zagorin Cave LLP; Robert W. Holland

(57) ABSTRACT

A wireless dongle couples to an information handling system port by inserting into a port along an insertion axis to interface with the information handling system processor. A circuit board couples orthogonal to a Type C USB connector and mounts a radio that communicates wireless signals with a peripheral device. A three dimensional antenna couples to the circuit board in a spaced parallel relationship to communicate wireless signals orthogonal the circuit board along the insertion axis to an input/output peripheral. Audio antenna couple at a top and bottom position of the connector to communicate with an audio peripheral based upon the orientation of the connector when inserted in the port.

20 Claims, 23 Drawing Sheets

(56) References Cited

U.S. PATENT DOCUMENTS

| | | | | |
|---|---|---|---|---|
| 2007/0132733 | A1 | 6/2007 | Ram | |
| 2008/0155312 | A1 | 6/2008 | Kao | |
| 2008/0288707 | A1 | 11/2008 | Nicolet | |
| 2009/0006677 | A1 * | 1/2009 | Rofougaran | G01S 19/35 710/63 |
| 2009/0143038 | A1 * | 6/2009 | Saito | H01Q 21/28 455/272 |
| 2011/0147560 | A1 | 6/2011 | Camarillo | |
| 2011/0159815 | A1 | 6/2011 | Wu | |
| 2013/0017786 | A1 * | 1/2013 | Kvist | H01Q 1/52 343/893 |
| 2013/0060517 | A1 | 3/2013 | Sanchez | |
| 2013/0274534 | A1 | 10/2013 | Gill | |
| 2014/0029215 | A1 * | 1/2014 | Cariou | H01Q 9/42 361/752 |
| 2015/0029060 | A1 | 1/2015 | Jeon | |
| 2015/0097737 | A1 | 4/2015 | Vemagiri | |
| 2015/0365507 | A1 | 12/2015 | Vasapollo | |
| 2016/0098362 | A1 | 4/2016 | Summers | |
| 2017/0289145 | A1 | 10/2017 | Boesen | |
| 2022/0133183 | A1 | 5/2022 | Garai | |
| 2022/0158361 | A1 | 5/2022 | Kim | |
| 2023/0324981 | A1 | 10/2023 | Sundaram | |
| 2024/0356195 | A1 | 10/2024 | Hsiao | |
| 2024/0397642 | A1 | 11/2024 | Matias | |
| 2025/0004571 | A1 | 1/2025 | Goh | |
| 2025/0004580 | A1 | 1/2025 | Goh | |
| 2025/0030491 | A1 | 1/2025 | Liu | |
| 2025/0047466 | A1 | 2/2025 | Wong | |
| 2025/0047470 | A1 | 2/2025 | Wong | |

* cited by examiner

INFORMATION HANDLING SYSTEM DONGLE WITH ORTHOGONAL RADIATING ANTENNA PLANES

BACKGROUND OF THE INVENTION

Field of the Invention

The present invention relates in general to the field of information handling system wireless communication, and more particularly to an information handling system dongle with orthogonal radiating antenna planes.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Often portable information handling systems are used with external peripheral devices that have a larger footprint so that end user interactions are less constrained. For example, a peripheral keyboard that communicates with a portable information handling system through wireless signals offers the advantage of a larger area to layout keys and a greater depth to support key presses as compared to integrated keyboards that couple in a portable housing. As another example, a peripheral keyboard that communicates with a portable information handling system through wireless signals offers a natural hand grasp movement interaction compared to the constrained space associated with a touchpad on a portable housing. Both the peripheral keyboard and peripheral mouse allow an end user to operate a distance away from the portable housing for improved comfort in a desktop environment and within a viewing arc of peripheral displays that present visual images of the portable information handling system. Wireless communication, such as by BLUETOOTH, avoids the need for cables between the peripheral device and information handling system to help declutter the desktop working environment. Wireless communication is typically supported at the information handling system with an integrated wireless network interface controller (WNIC) or, alternatively, a wireless dongle that couples to a port of the information handling system and includes a radio to transmit wireless signals coordinated through the port, such as with a Universal Serial Bus (USB) port. An advantage of a wireless dongle interface is that it will operate peripheral devices when an information handling system does not integrate a radio and the wireless communications may be secured to specific peripheral devices.

One difficulty with the use of wireless dongles is that the device has to fit into a port of the information handling system. Low profile information handling systems typically have thin housings that include miniature ports, such as Type C USB ports. In order to fit the radio in the dongle, miniature ports often result in long dongle footprints that are prone to breakage when plugged into a port at a side of the housing. The longer footprint is used in part to include an antenna, which can often have an orientation at an upper side of the dongle's circuit board so that, when the dongle is inserted into the port upside down, the wireless signal performance can be unstable with unpredictable connectivity strength when the antenna orients downward. For instance, when a mouse moves relative to a dongle, the radiation from the dongle antenna has a different pattern at different mouse positions. The type of antenna included in the dongle may also vary based upon the type and size of the peripheral device that the dongle interacts with and the type of information communicated by the dongle. For instance, a keyboard dongle is active during typing at typed increments with a large frame to support the antenna while a mouse dongle is active during movement with a small frame. In contrast, a speaker that plays audio communicates though a constant stream of information to a generally fixed location. As a result, each type of dongle tends to have its own footprint and layout, which increases tooling costs and impacts reuse and recycling of dongles. When a dongle breaks, it is typically thrown to waste since repair in the small dongle footprint is difficult.

SUMMARY OF THE INVENTION

Therefore, a need has arisen for a system and method which provides a robust low profile wireless dongle that couples to an information handling system housing.

A further need exists for a wireless dongle that breaks down for repair and replacement of components, such as to adapt to different types of peripherals.

In accordance with the present invention, a system and method are provided which substantially reduce the disadvantages and problems associated with previous methods and systems for wireless dongles that couple to an information handling system port. A circuit board couples to a port connector orthogonal the port connector port insertion axis so that the form of the wireless dongle displaces laterally to extend less far from the information handling system housing. The reduced length of the wireless dongle along the insertion axis provided by the orthogonal circuit board orientation reduces stresses associated with torsional forces applied to the wireless dongle.

The wireless dongle antenna couples in a cap having a spaced parallel relationship to the circuit board and transmitting wireless signals orthogonal the antenna and along the insertion axis towards a peripheral device, such as a mouse. The antenna interfaces with the circuit board through a pogo pin that has a spring bias to accept some movement without breaking. In one embodiment, the antenna embeds in a flexible material with an over mold to couple and decouple for ease of replacement and repair.

More specifically, an information handling system processes information with a central processing unit that executes instructions to process information in cooperation with a memory that stores the instructions and information. The information handling system interacts with peripheral devices through wireless signals, such as a peripheral mouse, peripheral keyboard and peripheral speaker that communicate through BLUETOOTH, BLE and WIFI wireless signals. A wireless dongle with a port connector inserts into a port of the information handling system to support wireless communications with a radio and antenna included in the wireless dongle. For instance, the wireless dongle has a Type C USB connector that inserts along an insertion axis into a Type C USB port at a side of an information handling system housing. The circuit board with a radio mounted on an upper surface couples in a fixed manner to the connector at an orientation orthogonal to the insertion axis, effectively reducing the length of the dongle by displacing footprint of the circuit board laterally. An antenna couples in a parallel spaced relationship above the circuit board and has a planar resonating portion that transmits along the insertion axis and towards a peripheral to a side of the housing. The antenna is held in place with members that extend to the circuit board and engage with rubber support feet and a pogo pin with a spring biased end pressing against a contact pad of the circuit board to communicate wireless signals with the radio and antenna. In various embodiments various types of antenna may be included with the wireless dongle, including input/output (I/O) antenna, audio antenna and phased array directional antenna.

The present invention provides a number of important technical advantages. One example of an important technical advantage is that an information handling system wireless dongle has a robust and low profile footprint by coupling a circuit board to a port connector with a Type C USB connector so that the circuit board is orthogonal the connector insertion axis. The effect is to have the footprint of the wireless dongle housing portion displaced laterally so that the dongle extends for a shorter distance from the information handling system housing. The shorter length reduces the risk of excessive torque applied against the wireless dongle resulting in breakage of the connector, circuit board and/or antenna. In addition, the antenna couples with rubber feet and a pogo pin interface to reduce the impact of any torsional forces that might transition through the antenna. In one embodiment, the antenna is embedded in flexible material, such as a silicon or rubber plastic by over mold, so that the antenna snaps in place for ready replacement and avoidance of undue torsional force generation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system wireless dongle offers improved peripheral interactions in a robust form adapted to small port form factors. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
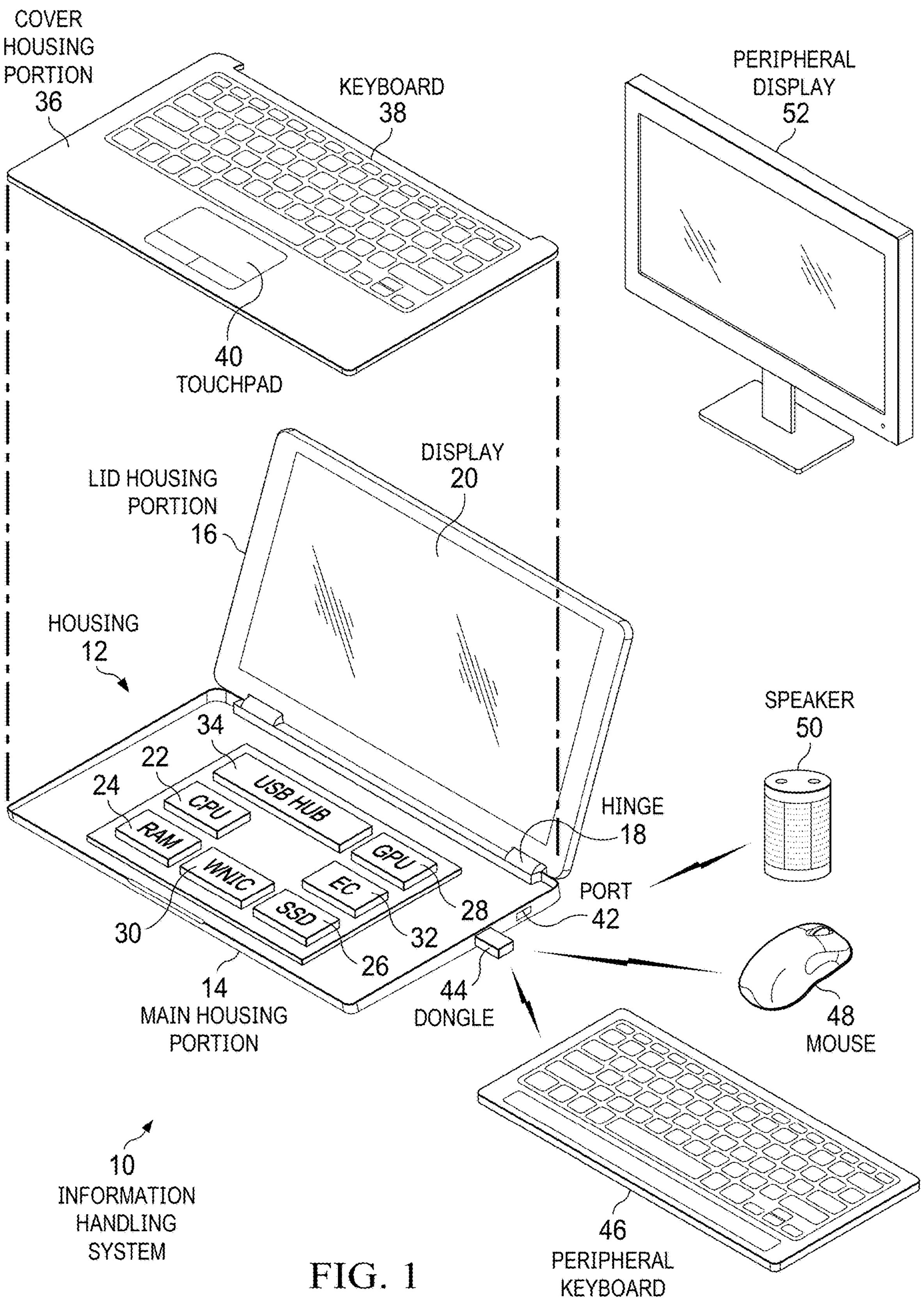
FIG. 1 depicts an information handling system configured to communicate wireless signals with a peripheral through a wireless dongle.

Referring now to FIG. 1, an information handling system 10 is depicted configured to communicate wireless signals with a peripheral through a wireless dongle 44. In the example embodiment, information handling system 10 has a portable configuration built in a portable housing 12 having a main housing portion 14 rotationally coupled to a lid housing portion 16 by a hinge 18. Alternative embodiments may use a fixed location configuration with a stationary housing, such as a desktop or tower. Portable information handling system 10 has a display 20 built into the housing lid portion 16 to present information as visual images. Housing main portion 14 contains processing components that cooperate to process information. For example, a central processing unit (CPU) 22 executes instructions to process information in cooperation with a random access memory (RAM) 24 that stores the information and instructions. A solid state drive (SSD) 26 provides persistent storage of instructions and information, such as an operating system and applications that are retrieved to RAM 24 for execution at CPU 22 on power up of the system. A graphics processing unit (GPU) 28 provides additional processing of information for presentation as visual images, such as generation of pixel values that define colors presented at an array of pixels of display 20. A wireless network interface controller (WNIC) 30 supports network communications, such as Ethernet, WIFI and Bluetooth. An embedded controller (EC) 32 manages physical interactions at the system, such as application of power and maintaining thermal constraints. EC 32 also manages interactions with inputs devices, such as keyboard 38 and touchpad 40 that couple to a housing cover portion 36 placed over housing main portion 14. A Universal Serial Bus (USB) hub 34 interfaces with EC 32 and CPU 22 to coordinate interfaces with external devices through USB ports 42. For instance, a Type C USB port 42 couples through a USB cable with a peripheral display 52 to present visual images.

In the example embodiment, plural peripheral devices interface with information handling system 10 through wireless communications supported by a wireless dongle 44. Wireless dongle 44 has a port connector that inserts into a port 42 to communicate through USB hub 34 with EC 32 and CPU 22. Within wireless dongle 44 is a radio that supports wireless communication with a variety of protocols, such as BLUETOOTH, BLE and WIFI. In addition, the radio can include peripheral-specific security measures so that wireless communications to peripherals have improved security. An end user plugs wireless dongle 44 into port 42 so that automated device discovery of the operating system, such as WINDOWS, configures information handling system 10 to interact with peripheral devices through wireless signals. In the example embodiment, the peripheral devices include a peripheral keyboard 46, a peripheral mouse 48, a peripheral speaker 50 and a peripheral display 52. In alternative embodiments other types of devices may be supported.

Figure 2:
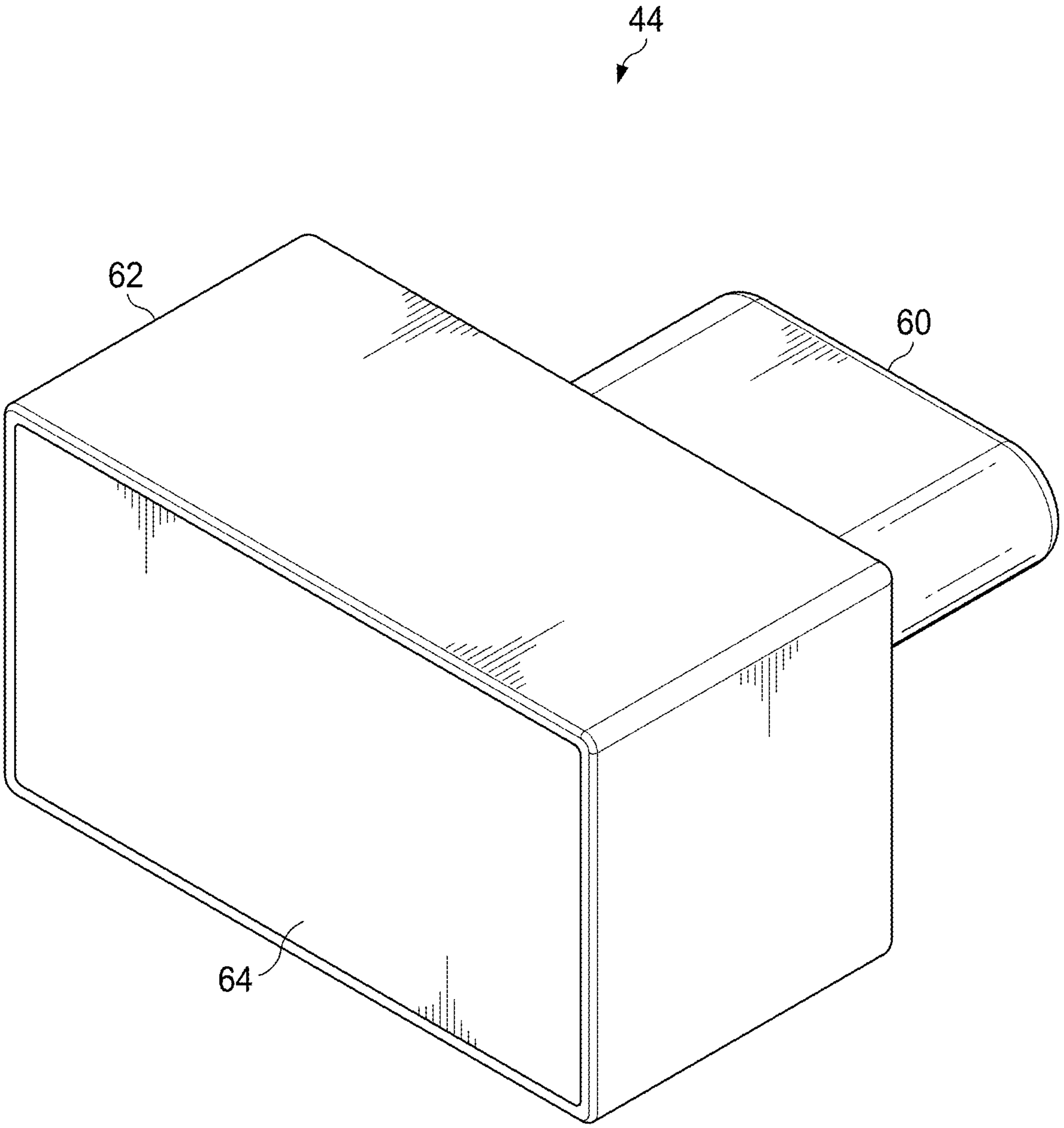
FIG. 2 depicts a front side perspective view of an example of a wireless dongle that couples to an information handling system port.

Referring now to FIG. 2, a front side perspective view depicts an example of a wireless dongle 44 that couples to an information handling system port. In the example embodiment, a Type C USB connector 60 inserts into an information handling Type C port to bring a cap 62 rear side against the information handling system housing. Cap 62 covers a circuit board with a radio in the cap interior and a cap lid 64 snaps in place at the cap to enclose the circuit board and radio. The small form factor of USB Type C connector 60 reduces the amount of space available for mechanical structure that strengthens the wireless dongle from breaking if stress is applied at cap 62. The amount of torque working against connector 60 is increased as the cap distance increases away from the connector along the insertion axis of the connector. In order to reduce the risk of breakage, cap 62 extends laterally from side to side to have a greater width than the connector and reduce the amount space needed for electronic components disposed along the connector insertion axis. In addition to reducing torque due to leverage of forces applied at the end of cap 62, the rear side of cap 62 finds support against the side of the information handling system housing. The width of cap 62 may be sized so that multiple ports located near each other have room to each accept a wireless dongle. In one embodiment, cap 62 may be coupled to connector 60 off center so that one side of the cap lines up with the connector and the opposite side extends past the connector so that plural wireless dongles may couple to adjacent ports by aligning placing the shorter width sides next to each other.

Figure 3A:
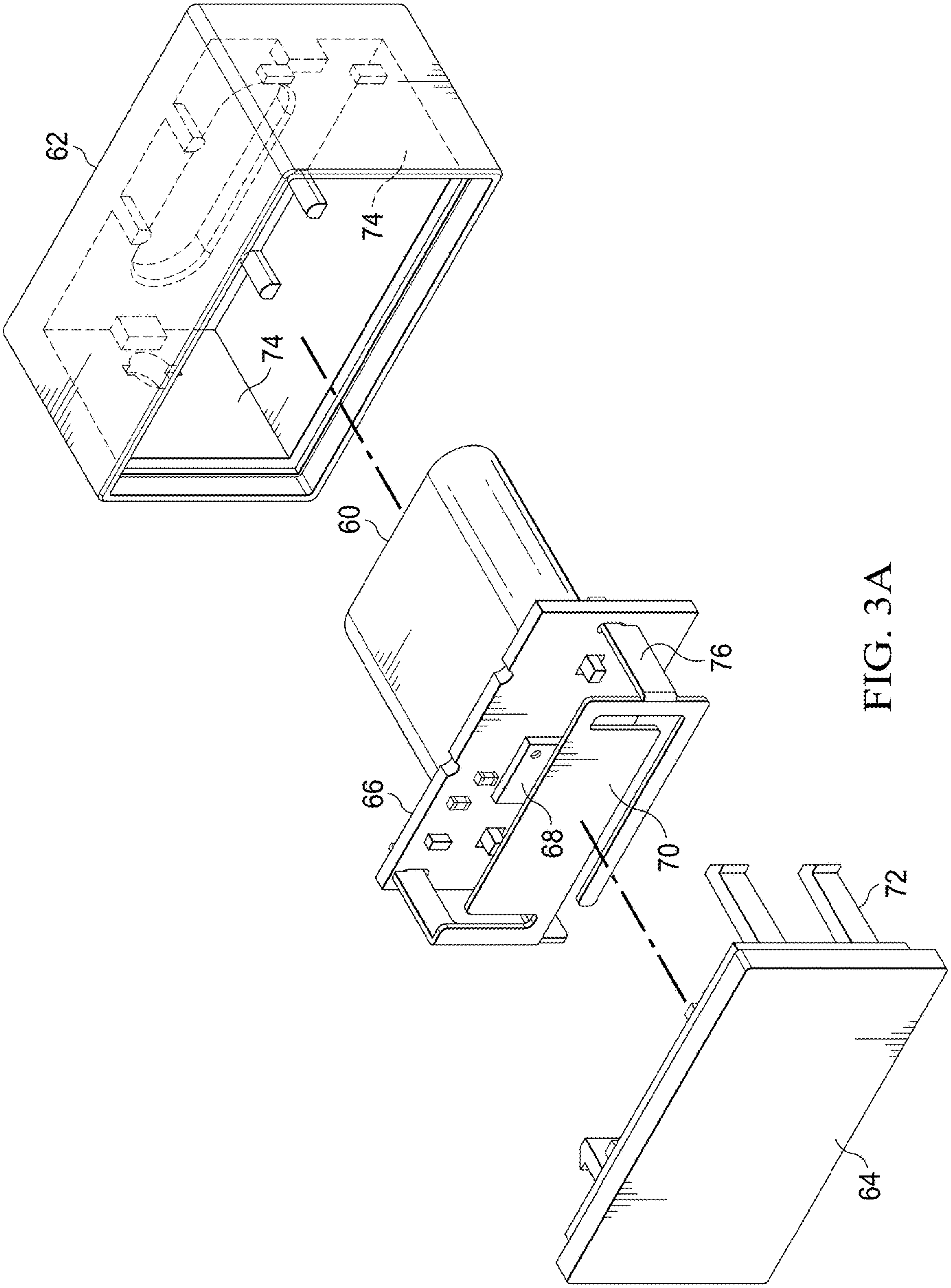
FIGS. 3A and 3B depict front and rear side perspective exploded views of the wireless dongle, a circuit board, and antenna orientation within the cap to reduce the wireless dongle length along the connector insertion axis.
Figure 3B:
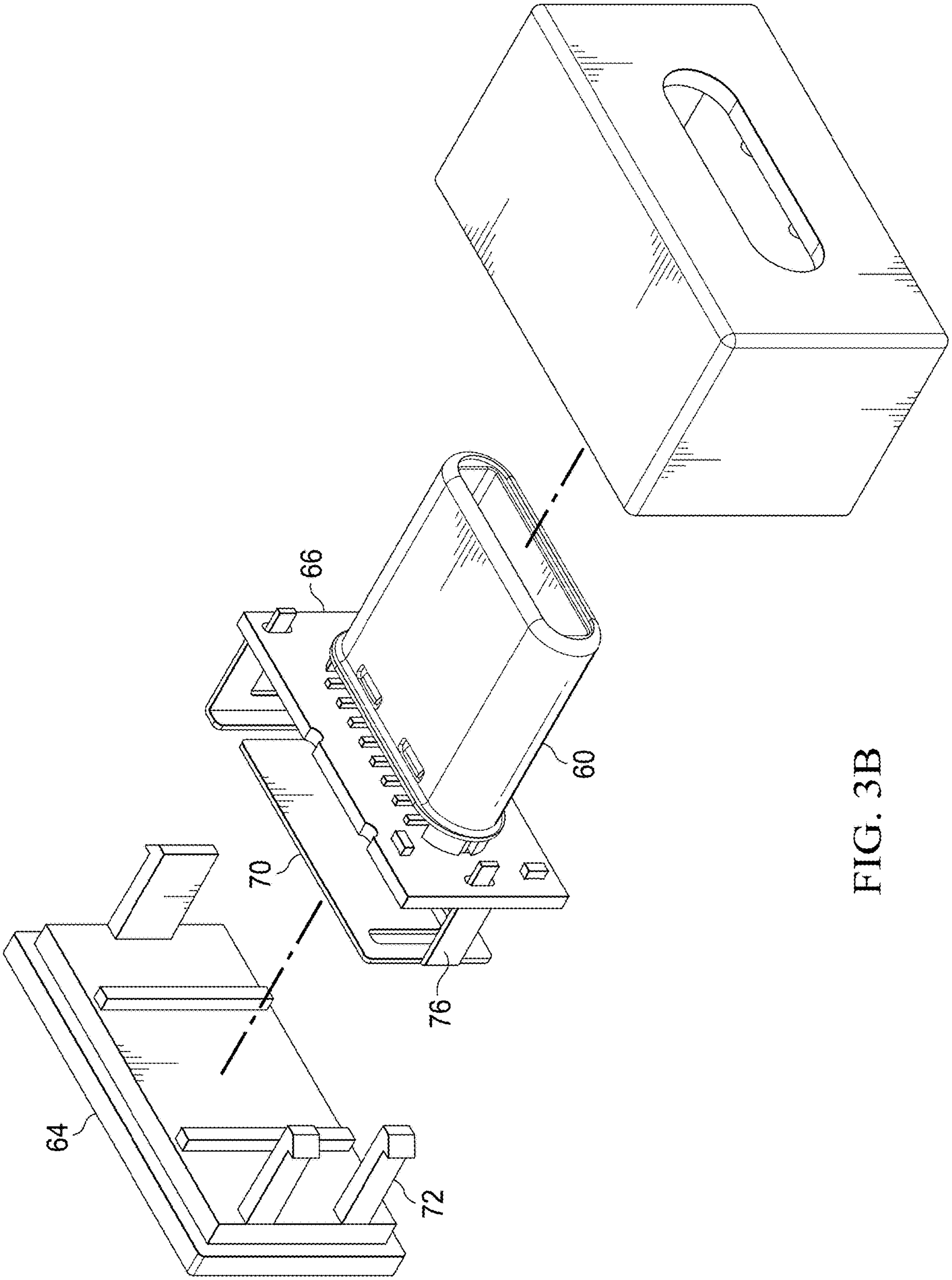

Referring now to FIGS. 3A and 3B, front and rear side perspective exploded views of the wireless dongle depict a circuit board and antenna orientation within the cap to reduce the wireless dongle length along the connector insertion axis. Cap 62 has a central opening that fits around connector 60 and slides to the base of a circuit board 66 that couples orthogonal to connector 60. A cap lid 64 has clips 72 that engage snap points 74 molded in the interior of cap 62 to hold cap lid 64 in place. A radio 68 couples to the outer side of circuit board 66 and includes processing resources and non-transitory memory to executed stored instructions, such as communication by plural radio protocols. An antenna 70 with a planar radiating member held in a spaced parallel relationship to circuit board 66 interfaces with radio 68 through a member 76 that couples to circuit board 66 and conducts wireless signals between antenna 70 and radio 68. Orientation of circuit board 66 perpendicular to the insertion axis of connector 60 disposes radio 68 and other electronic components along a width of the circuit board that is greater than the width of the connector, effectively translating spacing of the wireless dongle to have less length exposed past the end of connector 60 and more width out the sides of connector 60. Antenna 70 has a three dimensional form that extends out from circuit board 66 to have a parallel spaced relationship and to transmit wireless signals perpendicular to the antenna and along the insertion axis. In this example embodiment, no antenna is embedded on the circuit board itself so that all wireless signals are transmitted from an antenna spaced away from the circuit board so that the size of the circuit board is decreased relative to one that includes an antenna, such as when an antenna is formed as a wireline on the circuit board. The combination of circuit board and three dimensional metal antenna orientation reduces the length of the wireless dongle that extends out past connector 60 along the insertion axis. A metal antenna with a planar transmitting element directs wireless signal orientation in a front firing direction towards peripheral devices independent of wireless dongle plug orientation. The orthogonal orientation of the circuit board and antenna plane relative to the insertion axis includes some variation off a perpendicular right angle, such as to adapt to desired footprints of the wireless dongle than might use some length along the insertion axis, for instance, five to ten degrees.

Figure 4A:
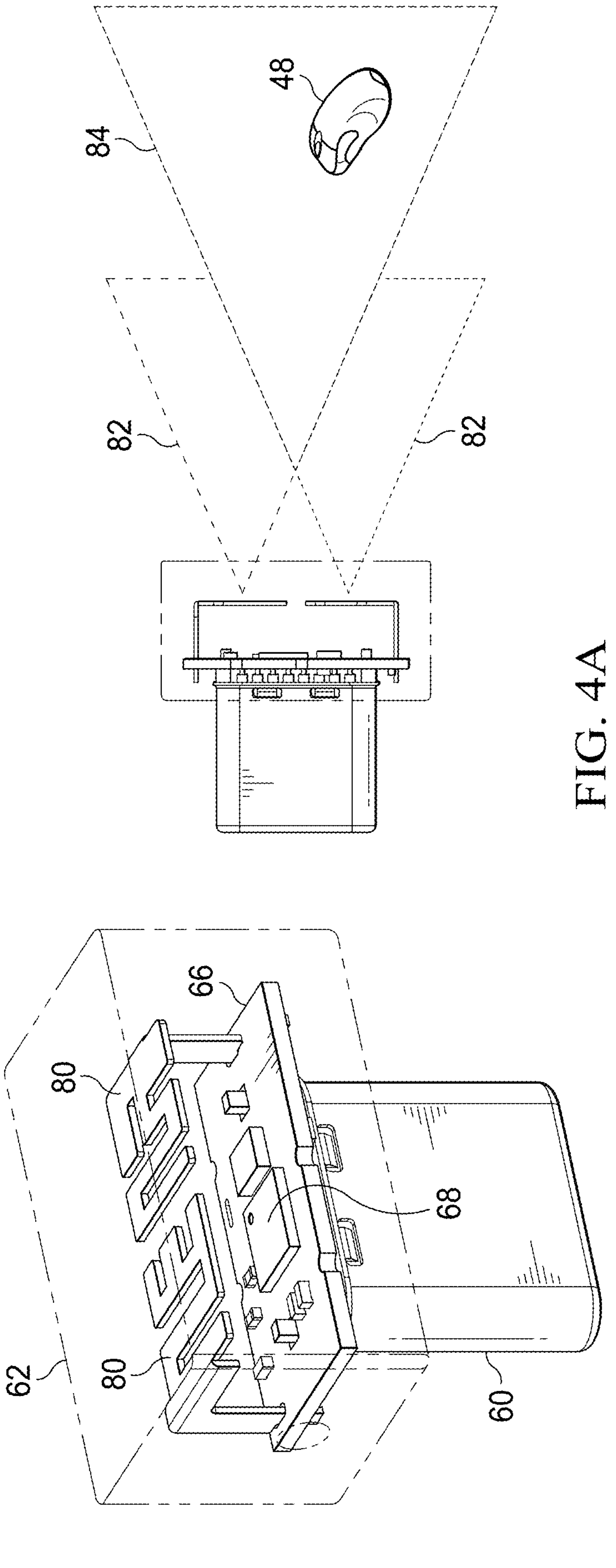
FIGS. 4A and 4B depict an alternative embodiment of a wireless dongle having a phased array antenna with two radiating antenna elements that cooperate by phase adjustments to direct wireless signals at a peripheral.
Figure 4B:
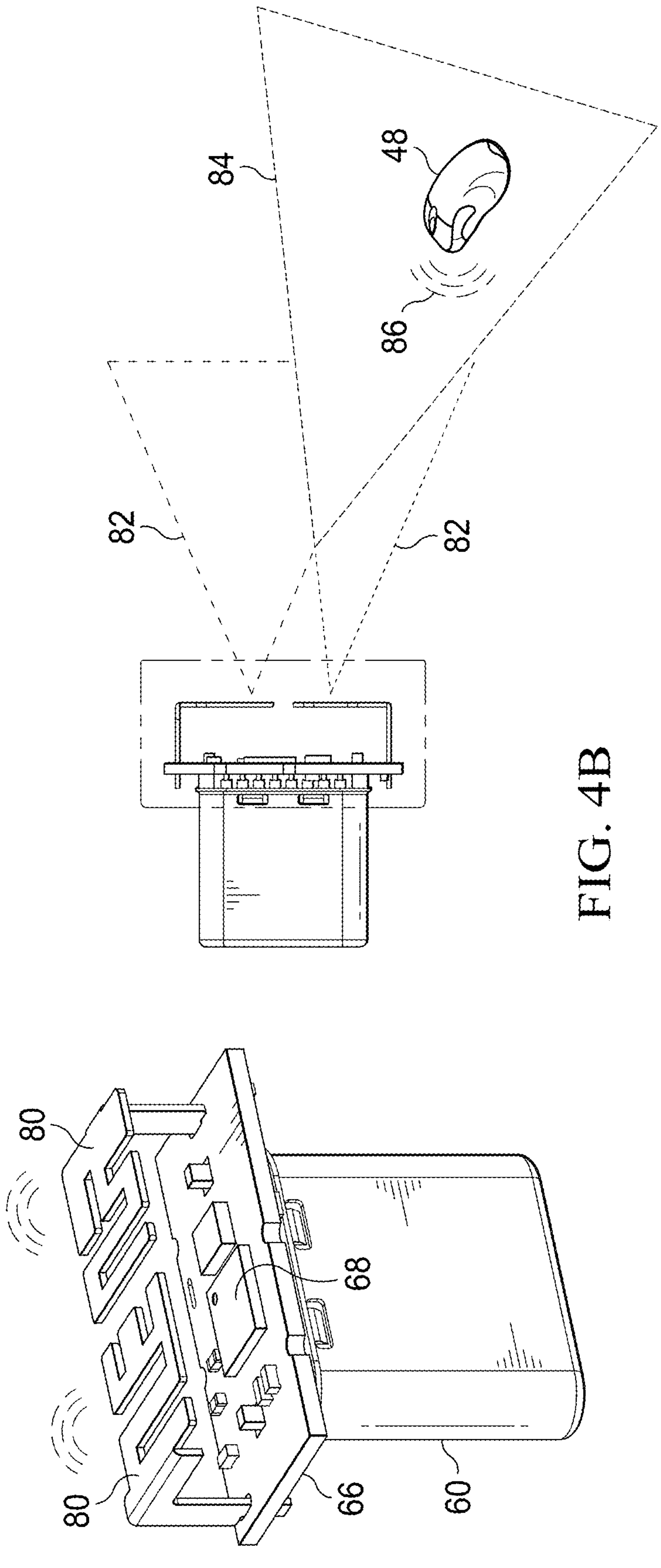

Referring now to FIGS. 4A and 4B, an alternative embodiment depicts a wireless dongle having a phased array antenna with two radiating antenna elements that cooperate by phase adjustments to direct wireless signals at a peripheral. In the example embodiment, cap 62 fits around connector 60 to enclose circuit board 66 having radio 68 configured to communicate through first and second phase array antenna elements 80. Phase array antenna elements 80 and circuit board 66 couple orthogonal to the insertion axis of connector 60 and cooperate to direct wireless signals orthogonal to the antenna elements and parallel the insertion axis. Radio waves 82 of the wireless signals communication from each phased array element 80 overlap in a superimposed pattern to generate a stronger beam 84 in a desired direction to improve connectivity with a peripheral, such as a mouse 48. As the peripheral or information handling system move relative to each other, logic executing on radio 68 to shift the phase of the transmitted radio signals so that the beam 84 is directed towards the peripheral device. In the example embodiment, the peripheral is a mouse 48 that moves and reports positions to the wireless dongle to control a cursor position presented on an information handling system display. As mouse 48 moves, it sends an angle of arrival information 86 to the wireless dongle that allows the wireless dongle radio processing resource to locate the mouse position and command a shift in phase of wireless signals to focus the beam 84 of superimposed radio waves 82 towards mouse 48. Improved wireless signal strength due to beam focusing reduces transmission power for less power consumption and incidental signal noise.

In the example embodiment, two small adjacent antenna elements mount to the same board aligned so that superimposed radio waves generate a beam of an enhance radiation zone that defines a phased array beam. To maintain the beam on a moving device, such as a mouse, the phased array antenna tracks the relative position of the wireless dongle and peripheral to constantly adjust the beam to focus on the peripheral. The relative position tracking is performed in part by the radio of the peripheral detecting the angle of arrival and sending the angle of arrival back to the wireless dongle. The wireless dongle receives the angle of arrival information to determine if the peripheral is in the beam forming zone of the phased array antenna and, when the peripheral is not in the directed beam, commands a shift in phase to direct the beam towards the peripheral. In alternative embodiments, the wireless dongle radio may determine angle of arrival of position reports by the mouse and apply the angle of arrival information to determine a direction for the beam, either alone or in combination with angle of arrival information reported by the mouse to the wireless dongle. In another alternative embodiment, mouse cursor control inputs may be used to determine a direction of movement of the mouse to determine changes in the relative position of the mouse from a previous position. As the mouse commands cursor position changes, the radio in the wireless dongle applies the cursor position changes to adjust the beam direction towards the mouse movements associated with the cursor position changes. In a situation where a mouse is used in combination with a keyboard, the wireless dongle tracks both positions and adjusts transmission phase to keep the beam focused on the peripheral for which a radio transmission is intended.

Figure 5:
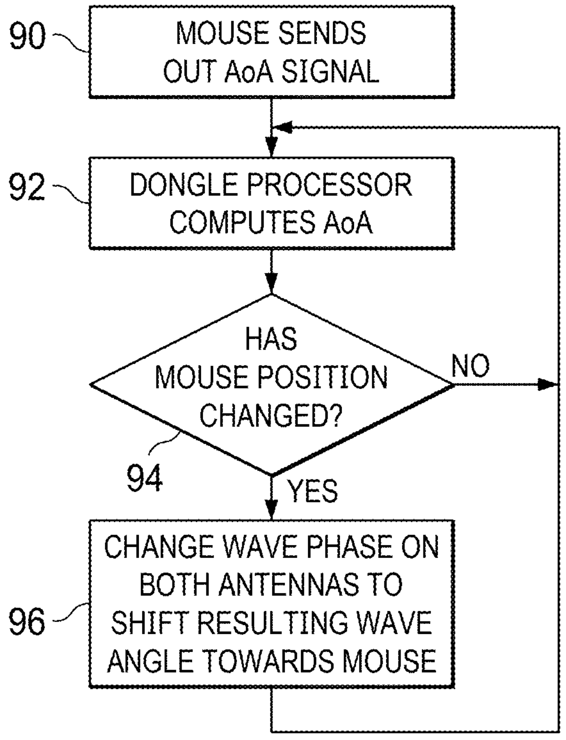
FIG. 5 depicts a flow diagram of a process for tracking a peripheral position to adjust a phased array antenna beam towards the peripheral.

Referring now to FIG. 5, a flow diagram depicts a process for tracking a peripheral position to adjust a phased array antenna beam towards the peripheral. The process starts at step 90 with the mouse or other peripheral sending the angle of arrival signal to the wireless dongle. At step 92 the wireless dongle processing resource computes the angle of arrival. At step 94, a determination is made of whether the mouse position has changed since the last beam direction was set at the phased array antenna. If the mouse position has not changed, the process returns to step 92 to continue monitoring the angle or arrival reported from the mouse and computed by the wireless dongle. If at step 94 the mouse position has changed, the process continues to step 96 to change the wave phase on both phased array antenna elements to shift the resulting beam angle towards the mouse's new position. The process then returns to step 92 to continue monitoring the mouse angle of arrival.

Figure 6A:
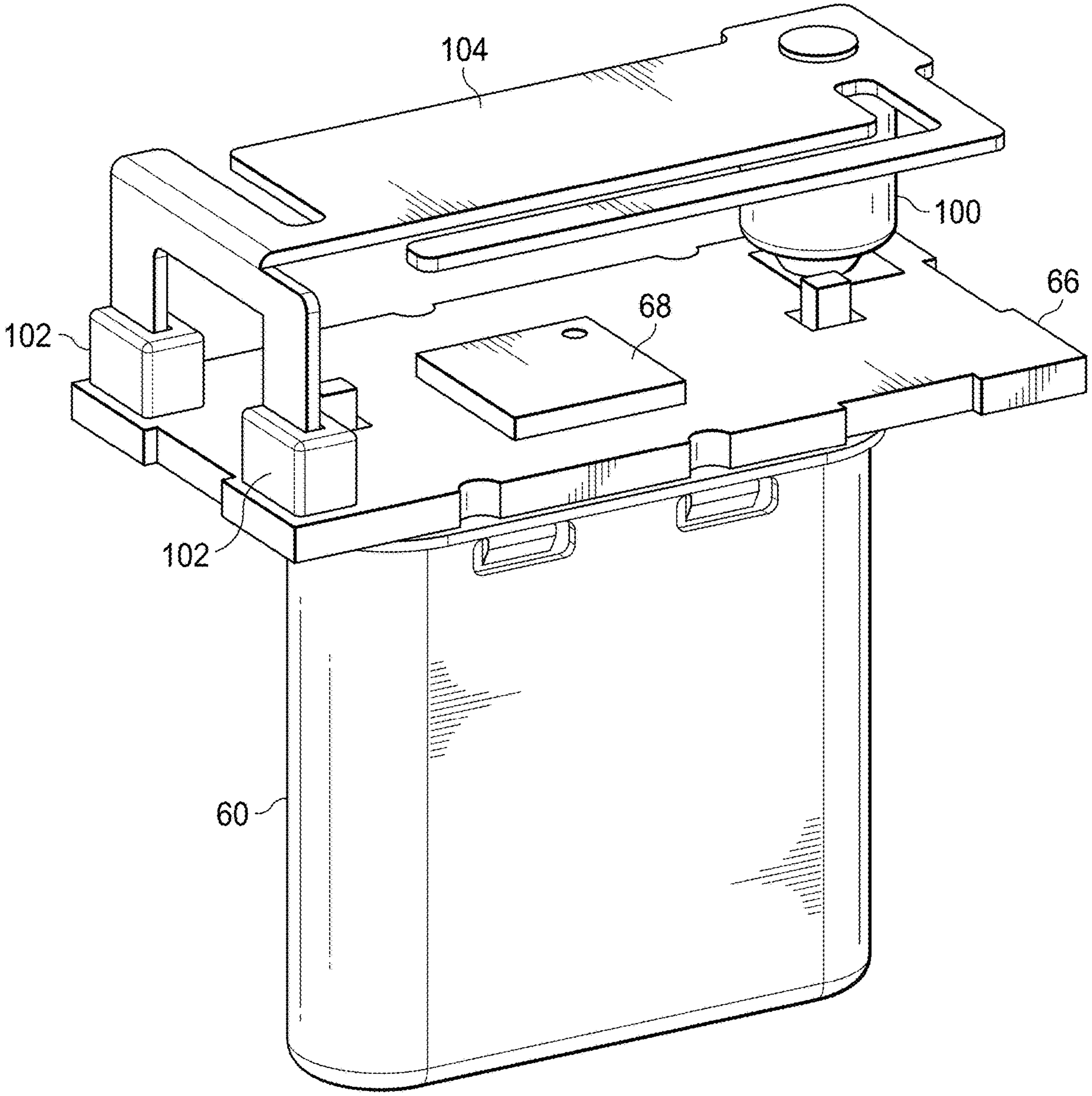
FIGS. 6A, 6B and 6C depict an example embodiment of the wireless dongle having a swappable antenna assembly that adapts the wireless dongle to different types of peripherals.
Figure 6B:
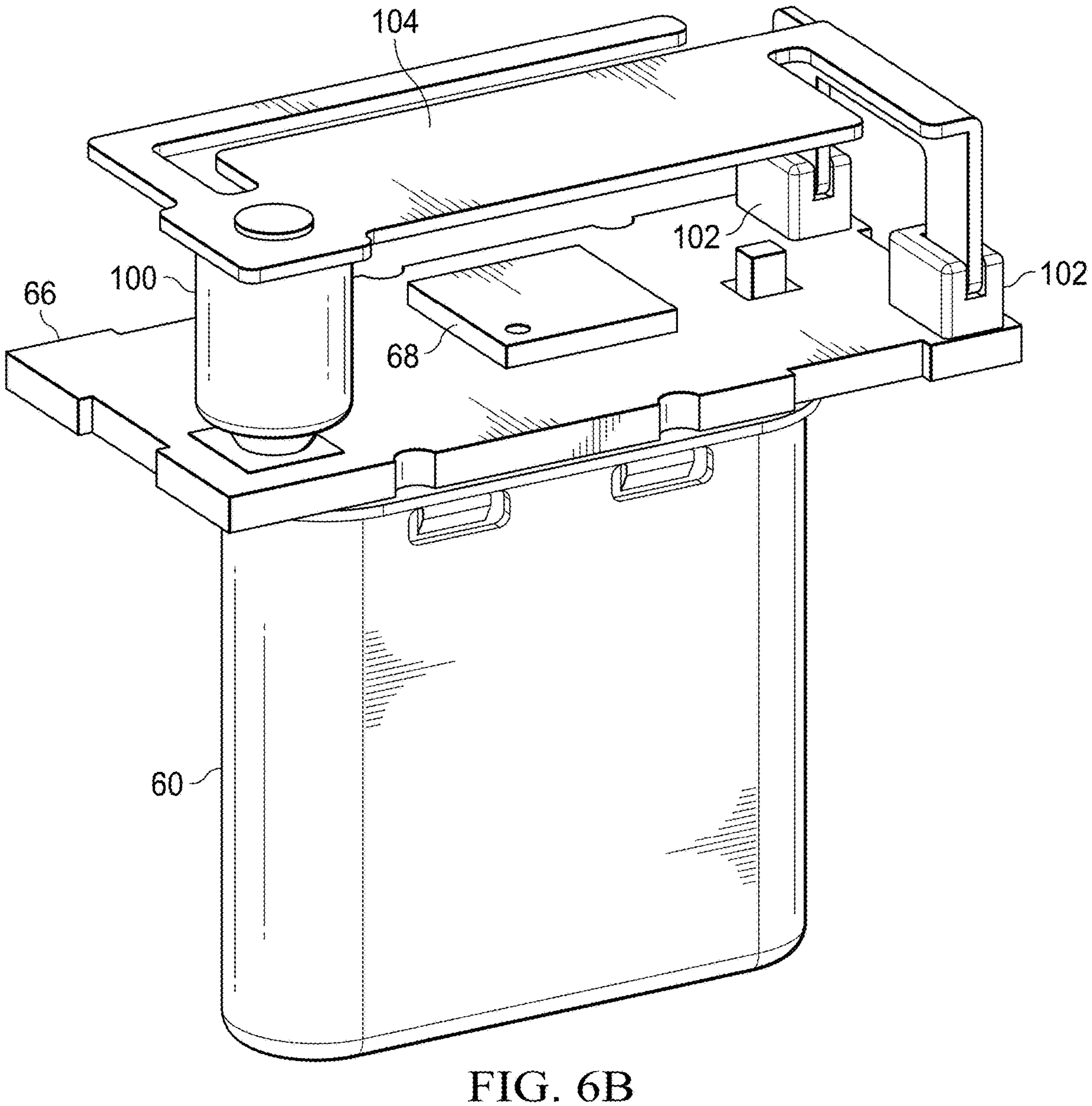
Figure 6C:
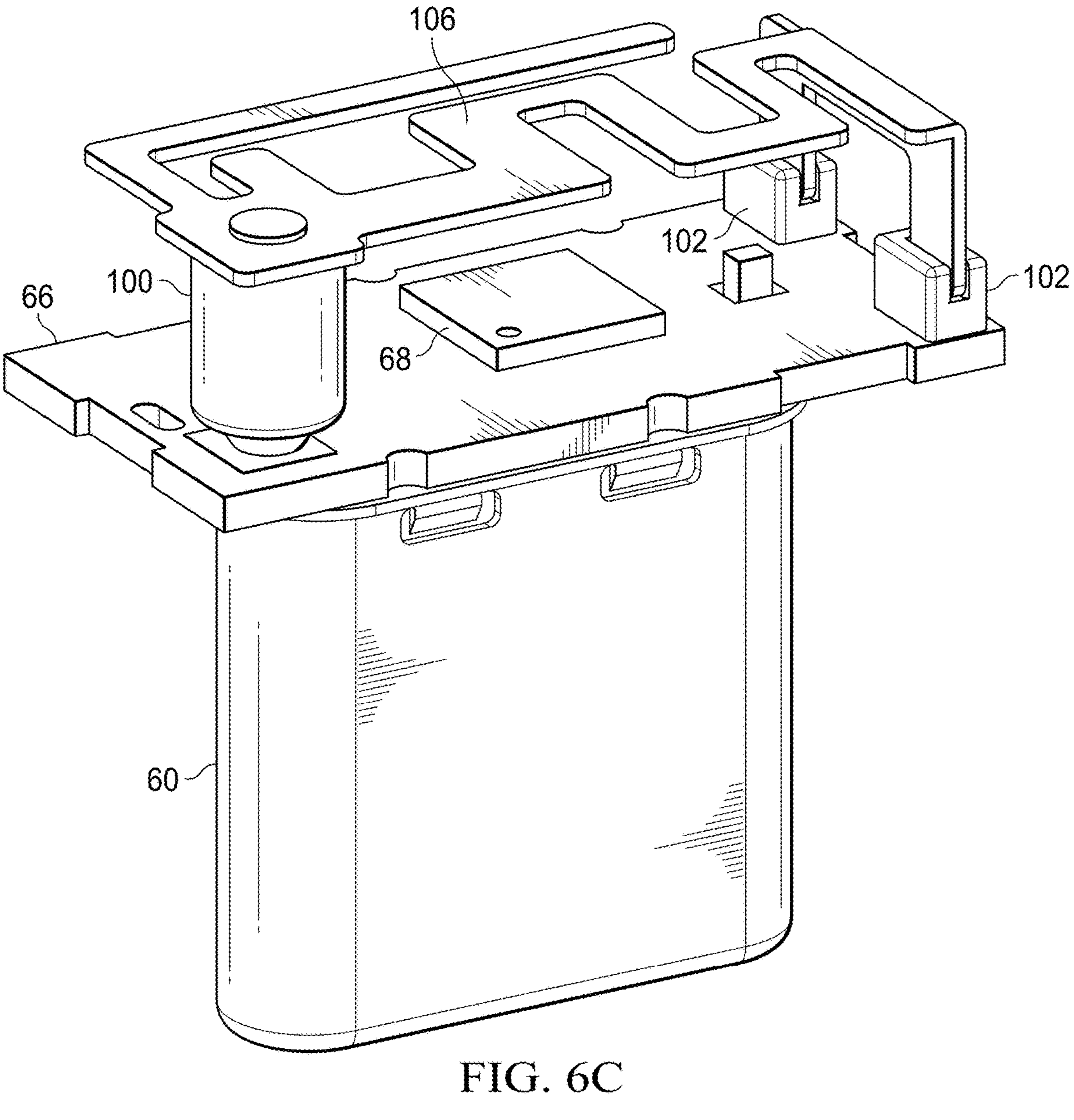

Referring now to FIGS. 6A, 6B and 6C, an example embodiment of the wireless dongle depicts a swappable antenna assembly that adapts the wireless dongle to different types of peripherals. In the example embodiment, a first antenna type is an input/output (I/O) antenna 104 shown in FIGS. 6A and 6B having a three dimensional form with a central planar region to receive and transmit wireless signals. A second antenna type is a dual L shape audio antenna 106 shown in FIG. 6C having a three dimensional "L" central region to receive and transmit wireless signals. In various other embodiments, other types of antenna forms may be used as desired to adapt the wireless dongle to different types of wireless protocols. The types of protocols include the types of radio waves used to transmit wireless signals and the formats of the wireless signals. For instance, wireless signal formats might include BLUETOOTH, BLE and WIFI, with the selection of a signal format based upon the amount of information transmitted and the expected distance of the transmission. The types of radio waves can vary from different types of digital formats to different types of analog formats. In some situations, a wireless dongle might be expected to perform mostly information reception, such as when a mouse or keyboard input device transmits end user inputs to the wireless dongle. I/O antenna might transmit wireless signals on only rare occasions, such as to issue a wake command. In comparison, an audio antenna might transmit wireless signals at a constant rate to send audio information packets to a speaker while receiving information from the speaker only intermittently. In one example embodiment, each antenna is optimized for either transmission or reception of wireless signals. In alternative embodiments described above, antenna may be optimized to transmit directional beams with phased array logic.

FIG. 6A depicts a wireless dongle base assembly having a connector 60 fixed by solder to a circuit board 66 supporting a radio 68. The base assembly has a swappable I/O antenna 104 removably coupled in place at circuit board 66 with rubber foot supports 102 on one side and a pogo pin 100 on an opposite side. FIG. 6B depicts pogo pin 100 coupled by solder to the bottom side of I/O antenna 104 and having a spring-biased contact pressing against a contact pad formed on circuit board 66. I/O antenna 104 has a three dimensional form with the planar antenna portion held in a spaced parallel relationship above circuit board 66. In the example embodiment, circuit board 66 footprint is kept to a minimum by not including an antenna on the circuit board. FIG. 6C depicts audio antenna 106 coupled into rubber foot supports 102 and having a pogo pin 100 with a spring biased end pressing against the circuit board contact pad for communication of antenna signals between the antenna and radio 68. Audio antenna 106 has a spaced parallel relationship with circuit board 66 with members extending down into rubber foot supports 102 to hold the antenna in position. In one example embodiment, the members of I/O antenna 104 and audio antenna 106 engage in rubber foot supports 102 with an identifying feature so that radio 68 can automatically determine which antenna is installed. For instance, rubber foot supports 102 may include a switch or a conductive open area that interfaces with a GPIO of radio 68. When an I/O antenna couples to the circuit board, a first one of the rubber feet has a contact closed that indicates an I/O antenna is installed; and when an audio antenna couples to the circuit board a second one of the rubber feet has a contact closed that indicates an audio antenna is installed. Based upon the detected antenna, firmware of radio 68 installs executable code associated with the protocol used by the antenna. The firmware can include executable code specific to the radio function, such as I/O device interactions versus audio interactions, as well as antenna specific settings, such as tuning to achieve desired resonance.

Figure 7:
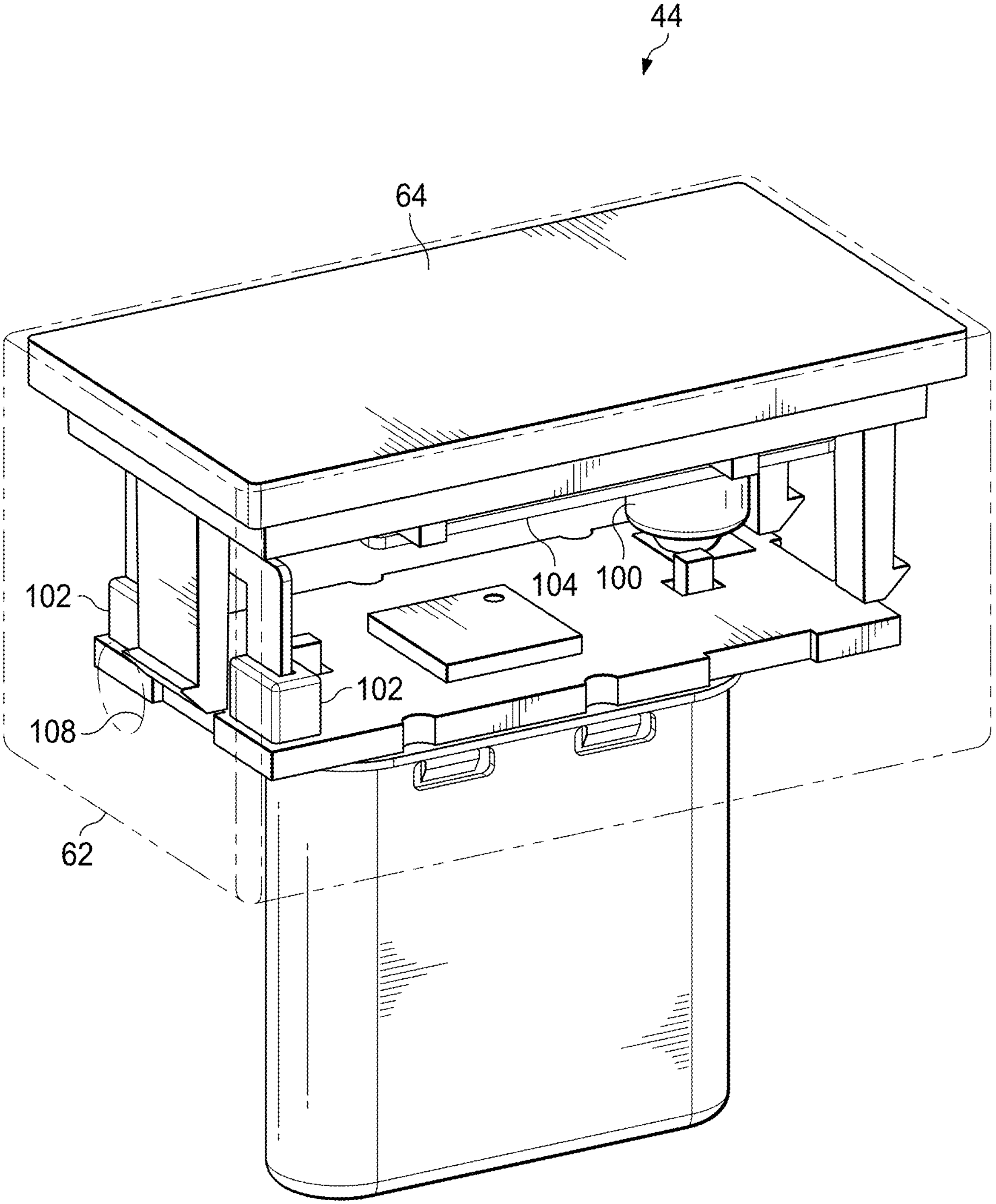
FIGS. 7 and 7A depict side perspective and exploded views of the wireless dongle to illustrate how to swap the antenna by removing the wireless dongle cap.
Figure 7A:
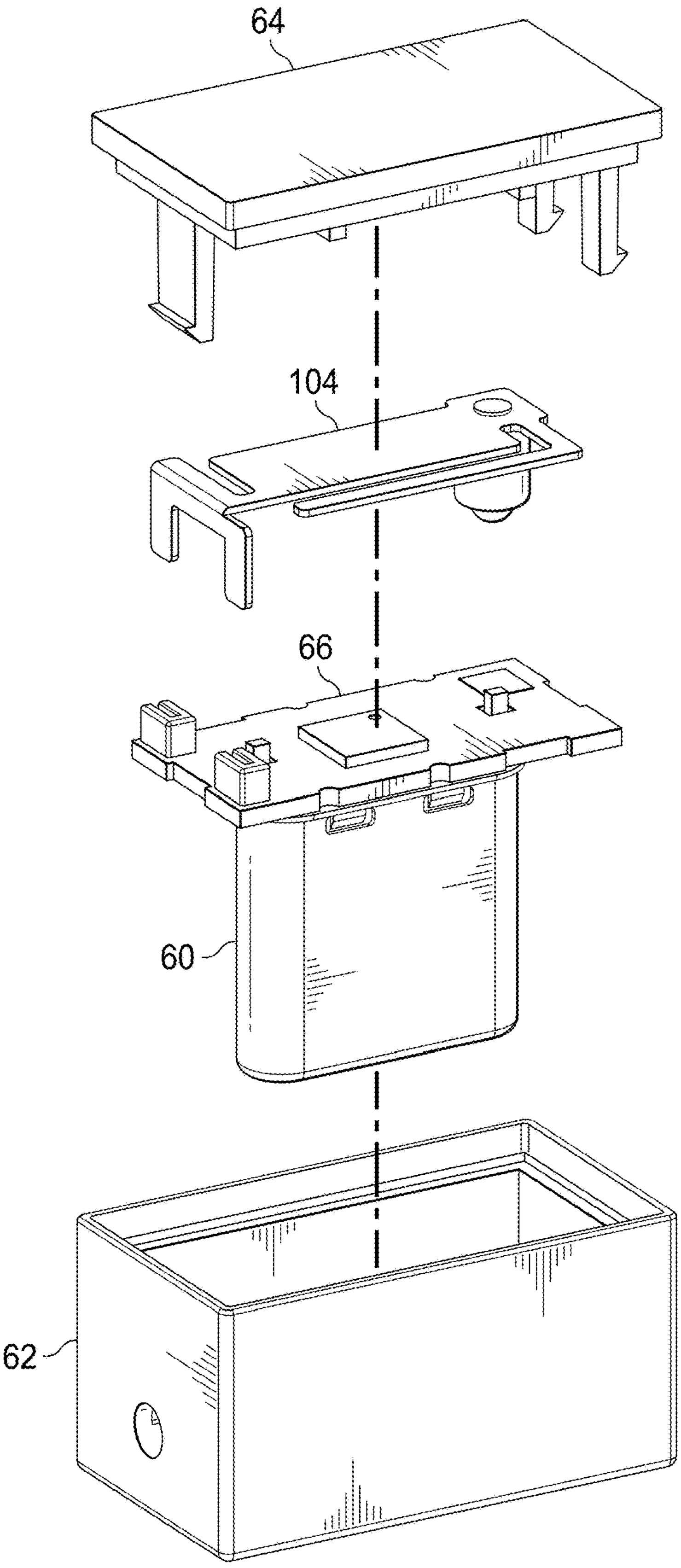

Referring now to FIGS. 7 and 7A, side perspective and exploded views of the wireless dongle illustrate how to swap the antenna by removing the wireless dongle cap. FIG. 7 depicts a transparent view of the wireless dongle with cap 62 coupled to connector 60 and held in place with cap cover 64 snapped into cap 62 and over antenna 104, which fits into rubber support foots 102 and communicates through pogo pin 100. An opening 108 formed in the side of cap 62 accepts a pin, such as a paper clip, that releases cap cover 64 by pushing inward on the clip. Once cap cover 64 lifts off cap 62, connector 60 slides out from the rear side opening of cap 62 to expose I/O antenna 104 for removal. This allows the antenna and/or circuit board to be reused in the event of partial damage caused to the wireless dongle. In one example embodiment, when the antenna is replaced with a different type of antenna to adapt the wireless dongle to a specific function, such as I/O or audio, an identifying mark on cap 62 or cap cover 64 is visible so that an end user can readily ascertain the function of the wireless dongle.

Figure 8A:
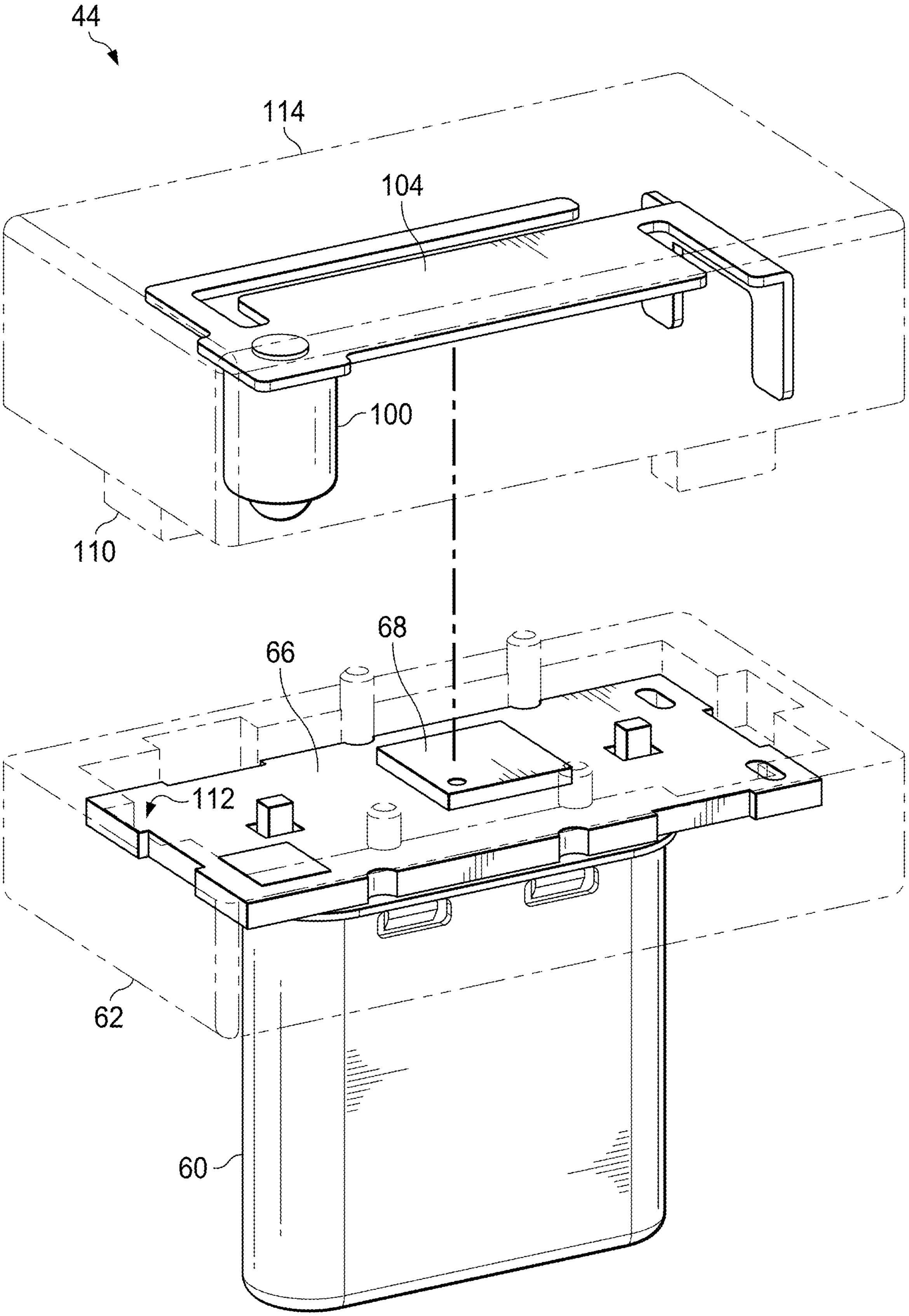
FIGS. 8A and 8B depict an example embodiment of a swappable wireless dongle antenna encapsulated in a flexible cover material.
Figure 8B:
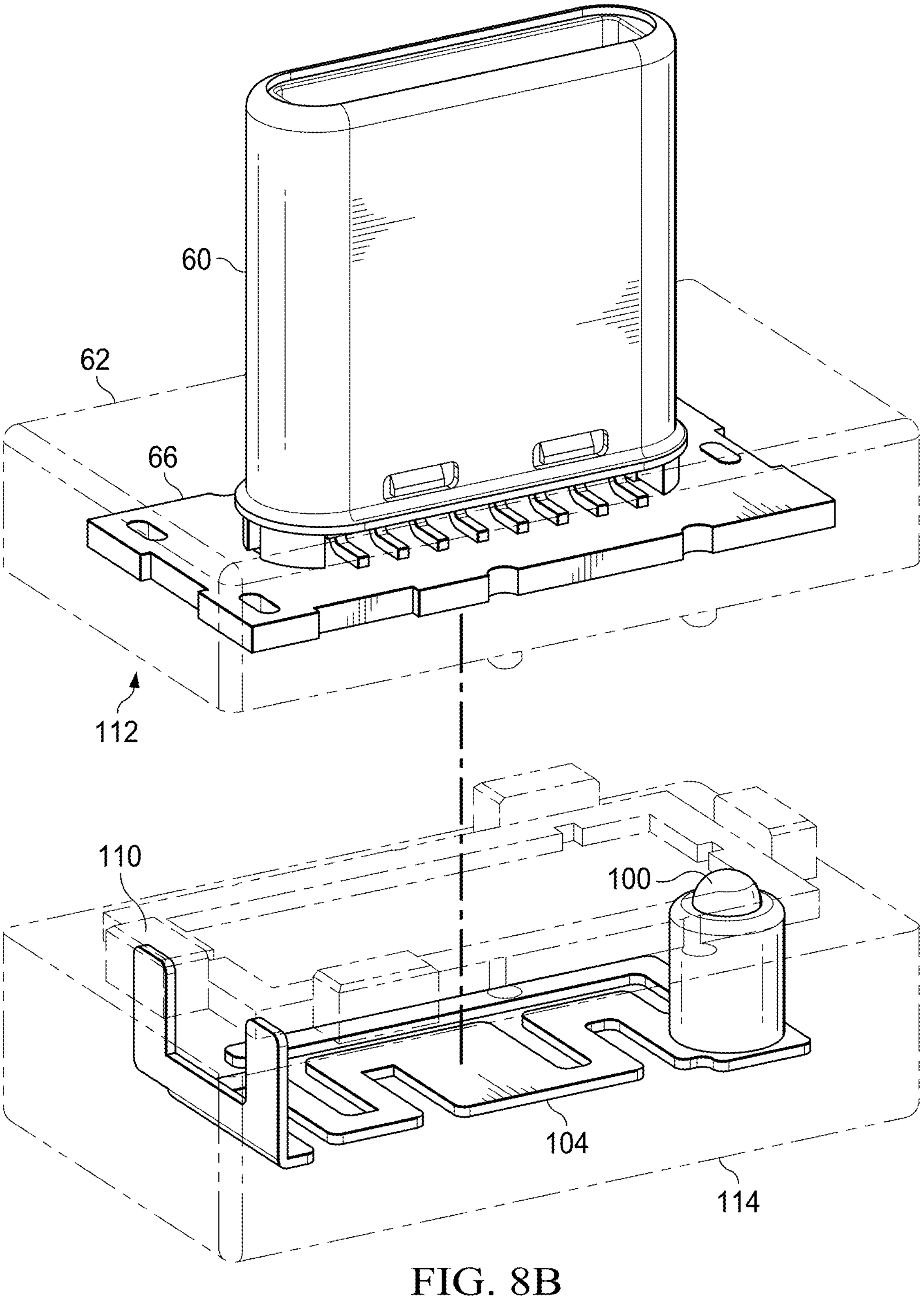

Referring now to FIGS. 8A and 8B, an example embodiment is depicted of a swappable wireless dongle antenna encapsulated in a flexible cover material. FIG. 8A depicts I/O antenna 104 encapsulated by over mold of a silicon or rubber plastic flexible material 114 and held in alignment with cap 62 to couple connectors 110 of the over mold material to connection points 112 of cap 62. Flexible material 114 with I/O antenna embedded in it forms the cap cover that couples over circuit board 68 when pressed down onto cap 62 and connector 60. FIG. 8B depicts the bottom surface of flexible material 114 with the spring biased end of pogo pin 100 exposed to interface with the contact pad of circuit board 68 when the flexible material engages to the cap. When an end user desires to adapt the functionality of the wireless dongle to a different function by changing the antenna as described above, the flexible material is pried free and replaced with a different flexible material cap having the desired antenna to support the selected functionality. In one example embodiment, the over mold flexible material has the type of antenna embedded in the flexible material marked on the outer surface, such as when an injection molding is performed.

Figure 9:
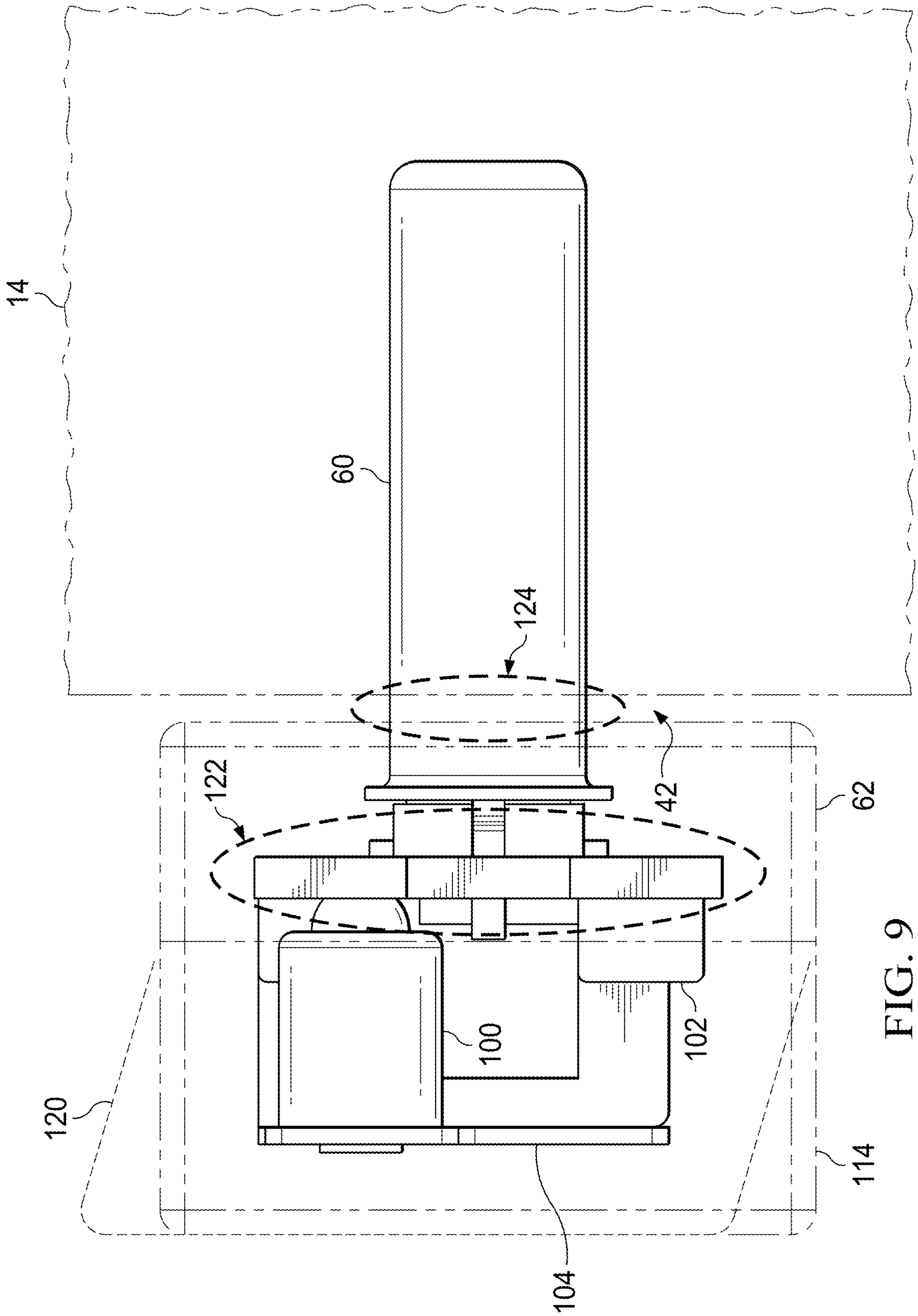
FIG. 9 depicts a side transparent view of the wireless dongle management of stress at the flexible material to avoid damage to electronic components.

Referring now to FIG. 9, a side transparent view of the wireless dongle depicts management of stress at the flexible material to avoid damage to electronic components. The wireless dongle connector 60 inserts into a port 42 of an information handling system housing main portion 14. When a force is applied against the lower side of flexible material 114, a deflection translates through the flexible material as indicated by dotted lines 120. Absorption of the force by flexible material 114 reduces bending forces 122 and 124 at the neck of connector 60, and the support feet 102 and pogo pin 100 interface with the circuit board allows the antenna to move relative to the circuit board without damaging the circuit board. Cap 62 has a hard plastic composition that holds and reinforces the USB Type C and circuit board as a unified assembly. Further, the hard plastic rests against housing main portion 14 near port 42 to receive strength from a flush fit.

Figure 10:
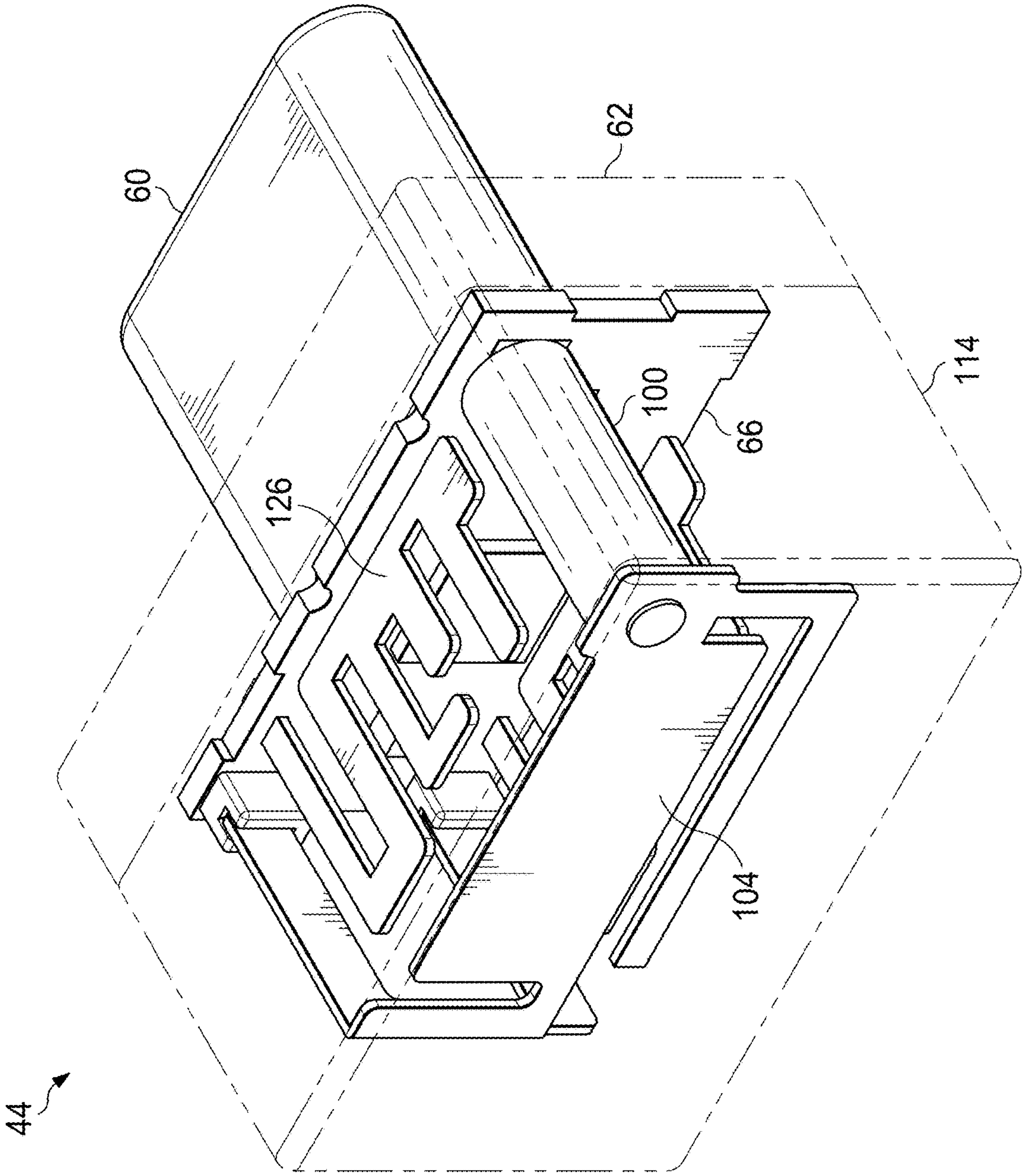
FIG. 10 depicts a transparent perspective view of an alternative embodiment of the wireless dongle having multiple antenna embedded in the flexible material coupled to the circuit board.

Referring now to FIG. 10, a transparent perspective view of an alternative embodiment of the wireless dongle depicts multiple antenna embedded in the flexible material coupled to the circuit board. In the example embodiment, wireless dongle 44 has a first three dimensional planar space I/O antenna 104 embedded in flexible material 114 and interfaced with circuit board 66 by a pogo pin 100. A second antenna 126 couples to circuit board 66 and is also embedded in flexible material 114. Cap 62 couples flexible material 114 and connector 60 as a complete assembly. Second antenna 126 extends from the board in a perpendicular orientation to transmit wireless signals, such as to support a speaker protocol in combination with the I/O protocol of the planar antenna.

Figure 11:
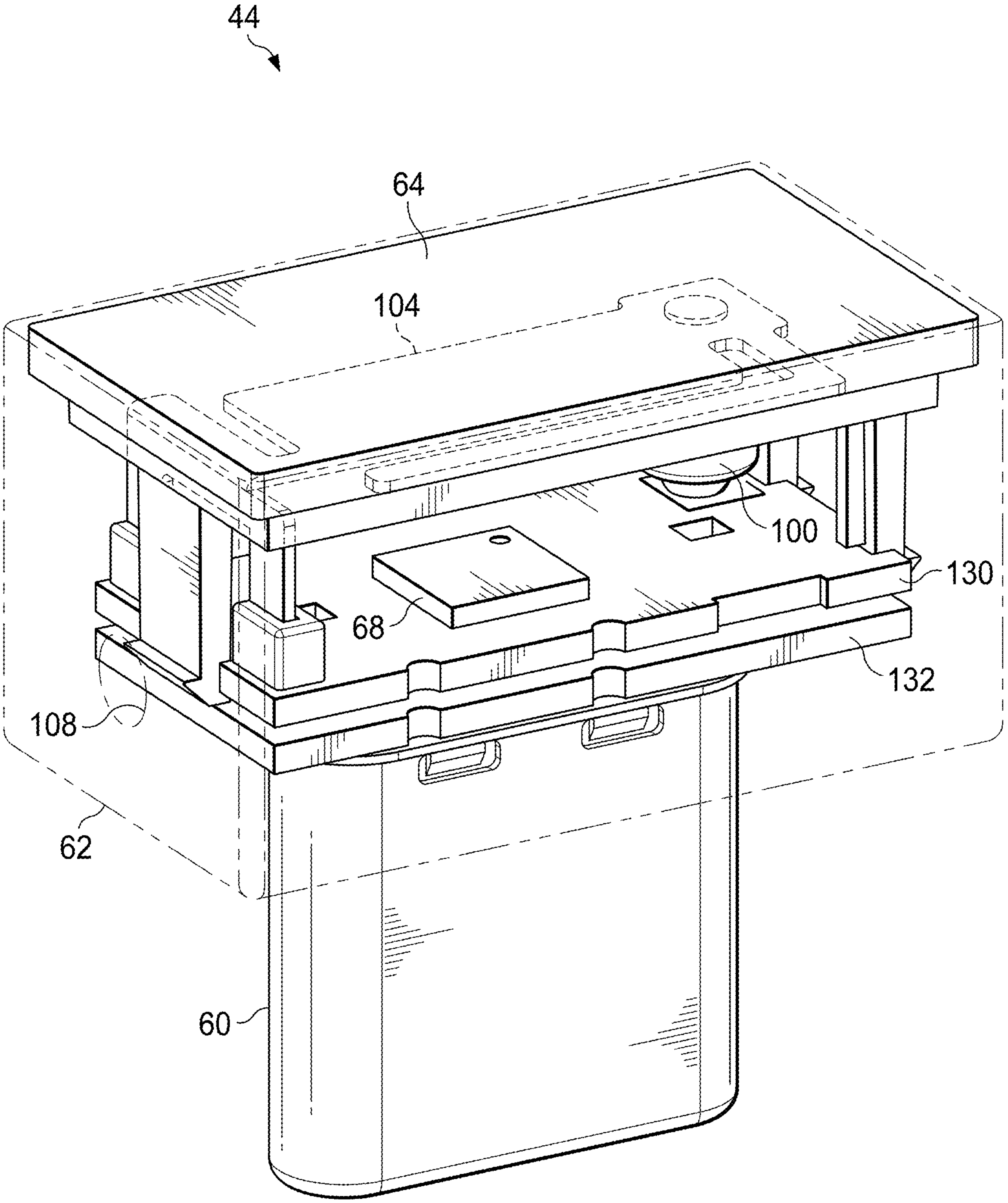
FIG. 11 depicts a transparent perspective view of an example embodiment of a wireless dongle having a dual circuit board arrangement.

Referring now to FIG. 11, a transparent perspective view depicts an example embodiment of a wireless dongle 44 having a dual circuit board arrangement. In the example embodiment, I/O antenna 104 couples to an upper circuit board layer 130 with rubber support feet and a pogo pin 100 as described above to communicate wireless signals with a radio 68. A connector 60 couples with fixed solder to a lower circuit board 132 that has an upper surface aligned with a lower surface of upper circuit board 130. Cap 62 and cap lid 64 coupled to the assembly together with an opening 108 aligned to release an inner latch that holds cap lid 64 to cap 62. Communication with an information handling system through a port and connector 60, such as with a Type C USB connector and port, is passed between lower circuit board 132 and upper circuit board 130 to reach radio 68. In the example embodiment, all of the processing resources for performing the wireless dongle features are included on upper circuit board 130 so that lower circuit board 132 only fixes connector 60 to the wireless dongle. In alternative embodiments, some electronic components may be included on lower circuit board 132.

Figure 12:
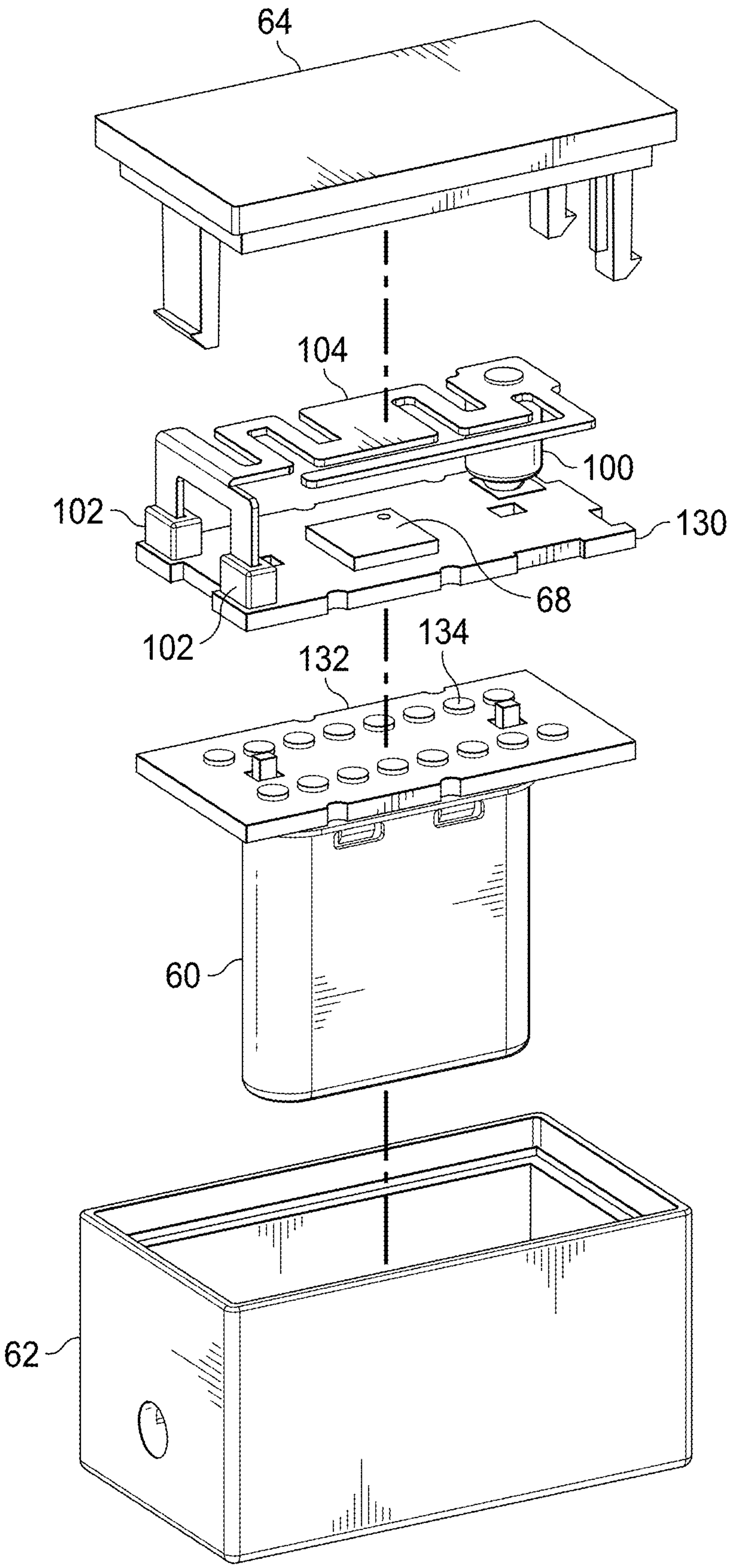
FIGS. 12, 12A and 12B depict exploded perspective views of a disassembly of the wireless dongle when a pin is pushed through the opening to release the cap lid latch.
Figure 12A:
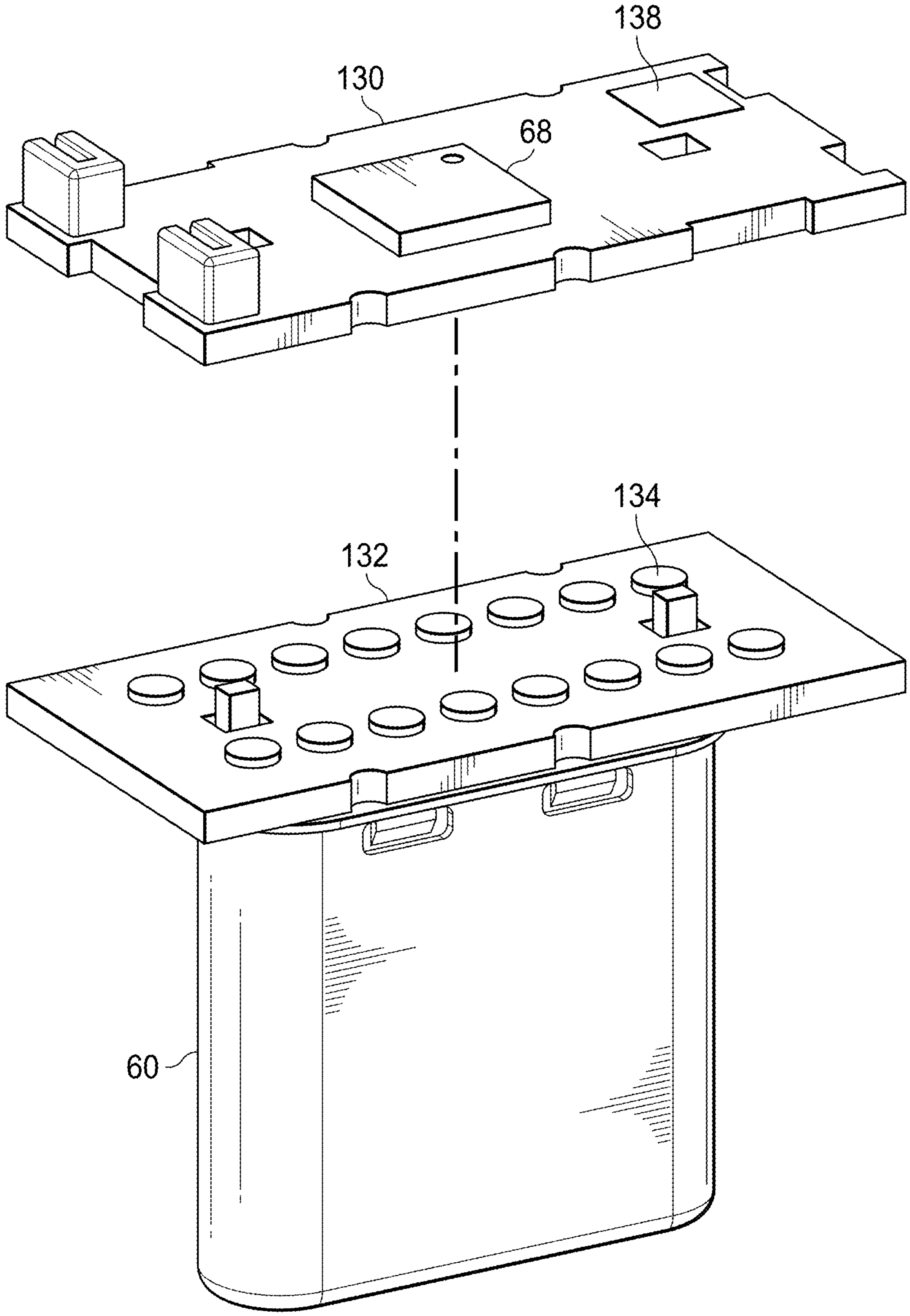
Figure 12B:
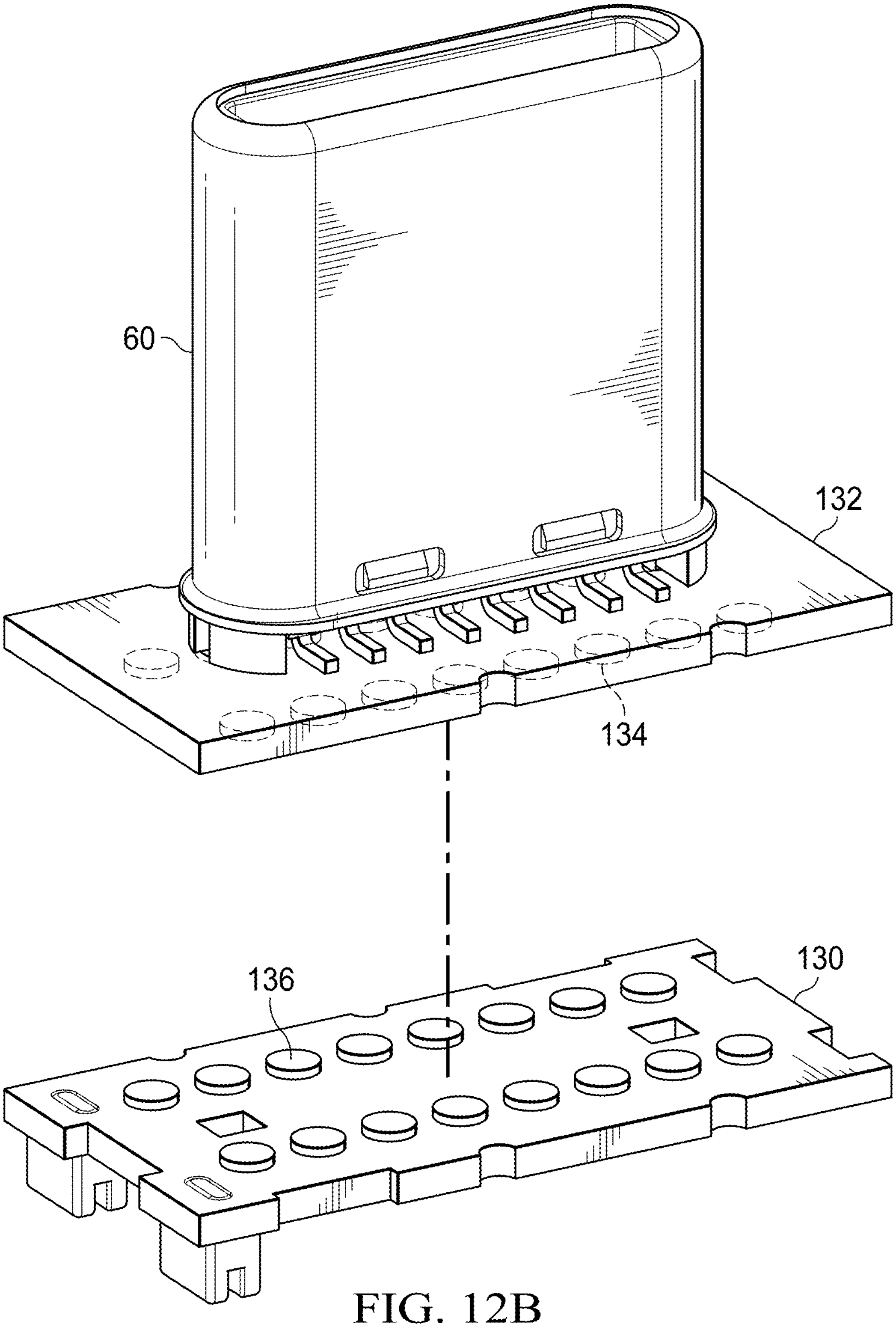

Referring now to FIGS. 12, 12A and 12B, exploded perspective views depict a disassembly of the wireless dongle when a pin is pushed through the opening to release the cap lid latch. With cap 62 and cap lid 64 released, upper circuit board 130 and lower circuit board 132 are released from compression against each other to separate so that the I/O antenna 104 assembled in rubber support feet 102 and radio 68 are released as an assembly from lower circuit board 132 and connector 60, which are also fixed as an assembly. Sixteen contact points 134 are printed on lower circuit board 132, such as with conductive silicon containing graphite or silver. Contact points 134 are held in alignment with gold contact pads 136 on upper circuit board 130 bottom side by alignment pins extending up from lower circuit board 132 and into alignment openings of upper circuit board 130. A contact pad 138 printed on the upper side of upper circuit board 130 aligns with pogo pin 100 to communicate between radio 68 and I/O antenna 104. When the wireless dongle is coupled in place by the cap and cap lid, silicon contact points 134 compress against gold contact points 136 to communicate between the connector assembly and radio assembly without the two separate assemblies being fixed in position to each other. In addition, I/O antenna 104 has some freedom of movement support by flexing of the rubber support feet 102 and the spring biased contact of pogo pin 100 against contact pad 138.

An advantage of the dual board connector using conductive silicon contacts is that stress working against the connector and the cap is more readily absorbed to reduce the risk of damage to the wireless dongle. To further reduce the impact of stress, the antenna may be embedded in flexible material as described above. Another advantage is that a change of a function of the wireless dongle is performed by changing the upper circuit board with a different radio and antenna coupled to the upper circuit board. In addition, repair and reuse of the separate connector and radio assemblies is simplified. When a wireless dongle fails at the connector, a different connector assembly is coupled to the radio assembly. In one embodiment, the wireless dongle readily adapts to support different types of connectors, such as by swapping the connector assembly to interface a Type B USB connector with the radio assembly.

Figure 13:
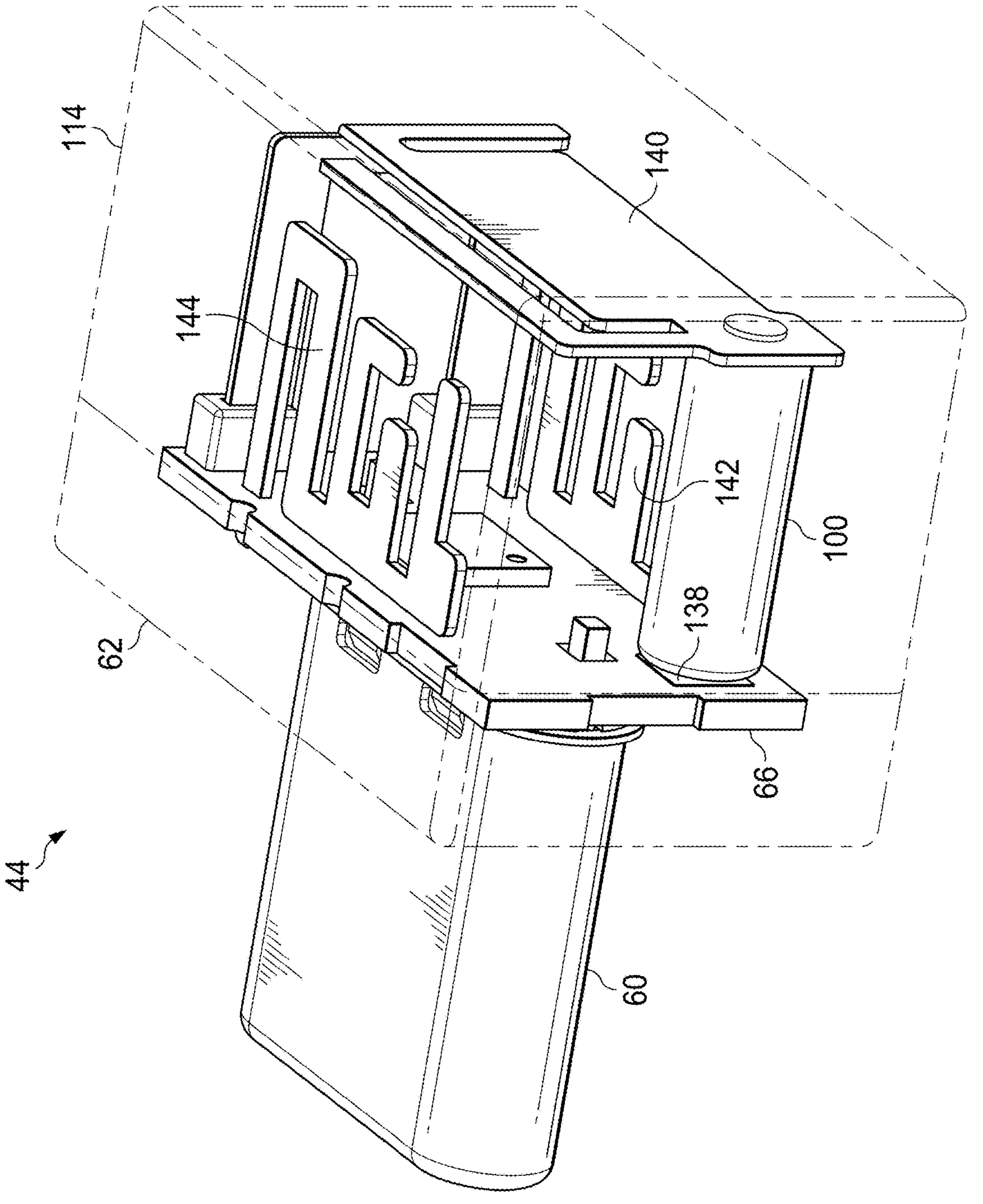
FIG. 13 depicts a transparent perspective view of a wireless dongle having three antenna included to support both I/O and audio functionality.

Referring now to FIG. 13, a transparent perspective view depicts a wireless dongle having three antenna included to support both I/O and audio functionality. In the example embodiment, connector 60 is a small form factor Type C USB connector that couples to a bottom side of a circuit board 66 having an orthogonal orientation. A first antenna 140 couples to circuit board 66 in a spaced parallel relationship to hold a planar resonating portion above a radio and aligned to communicate wireless signals along the insertion axis of connector 60, such as in a direction of a peripheral input/output device like a mouse or keyboard. Second and third antenna 142 and 144 are oriented along the connector insertion axis and orthogonal the circuit board and first antenna. In the example embodiment, all three antenna are embedded in a flexible material 114 and coupled in place by a cap 62 assembled around circuit board 66. A pogo pin 100 interfaces the first antenna 140 to the circuit board at a contact pad 138 of circuit board 66. Second and third antenna 142 and 144 have extension members out of flexible material 114 that plug into sockets of circuit board 66. In the example embodiment, a single radio supports communication through each of the antenna, although an alternative embodiment might have separate radios that support I/O and audio functions with each radio interfaced with one of the I/O or audio antenna.

The placement of the I/O antenna is a parallel spaced relationship to the circuit board and orthogonal the insertion axis of connector 60 displaces antenna placement in lateral direction so that the length of the wireless dongle is reduced with an increase in the width. The shorter length reduces the risk of damage to the circuit board due to incidental forces and stresses working against the wireless dongle. The longitudinal spacing between the I/O antenna and circuit board provides space for including a set of two audio antenna configured to communication audio information. The planar I/O antenna radiates along the insertion axis in the expected direction of a mouse and primarily functions as a receiver to accept end user mouse and keyboard inputs. In contrast, the audio antenna primarily functions to communicate a stream of audio information to a speaker having a location that can vary around an information handling system. The audio antenna radiates orthogonal the antenna orientation and out from the cap 62 to help minimize radiation directed towards the planar I/O antenna. For instance, the planar I/O first antenna 140 is placed in a null zone of the antenna radiation pattern of both the second and third antenna 144, such as when the main lobe of each audio antenna proceeds orthogonal the antenna and out the near side of the flexible material or cap at the antenna. Thus, the arrangement of the three antenna provide an optimal dual function support in a reduced footprint that is replaceable by coupling a different molded flexible material to the cap. In an alternative embodiment, a cap and cap lid may be used instead of a flexible material having embedded antenna.

Figure 14A:
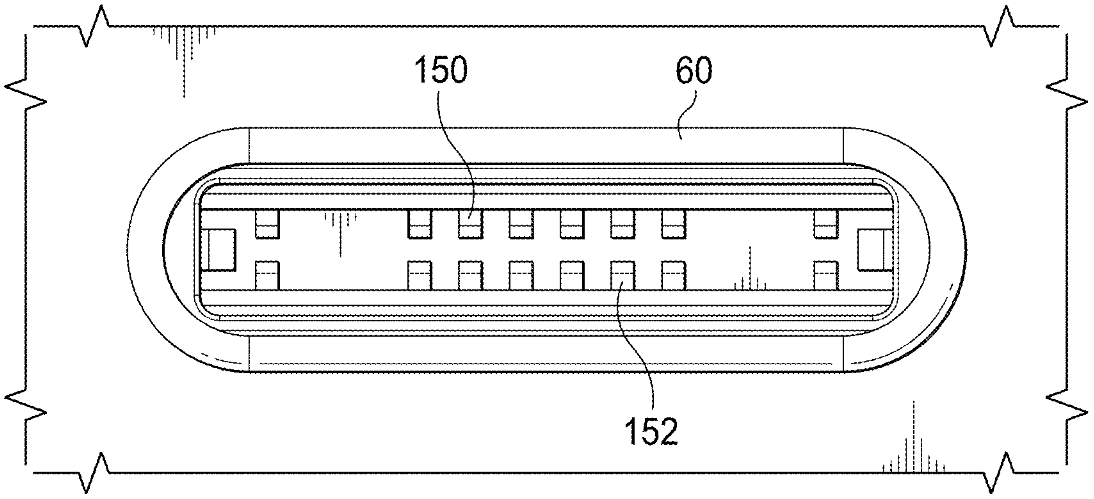
FIGS. 14A and 14B depict the wireless dongle with three antenna in opposite orientations that determine which audio antenna transmits to a speaker peripheral.
Figure 14A:
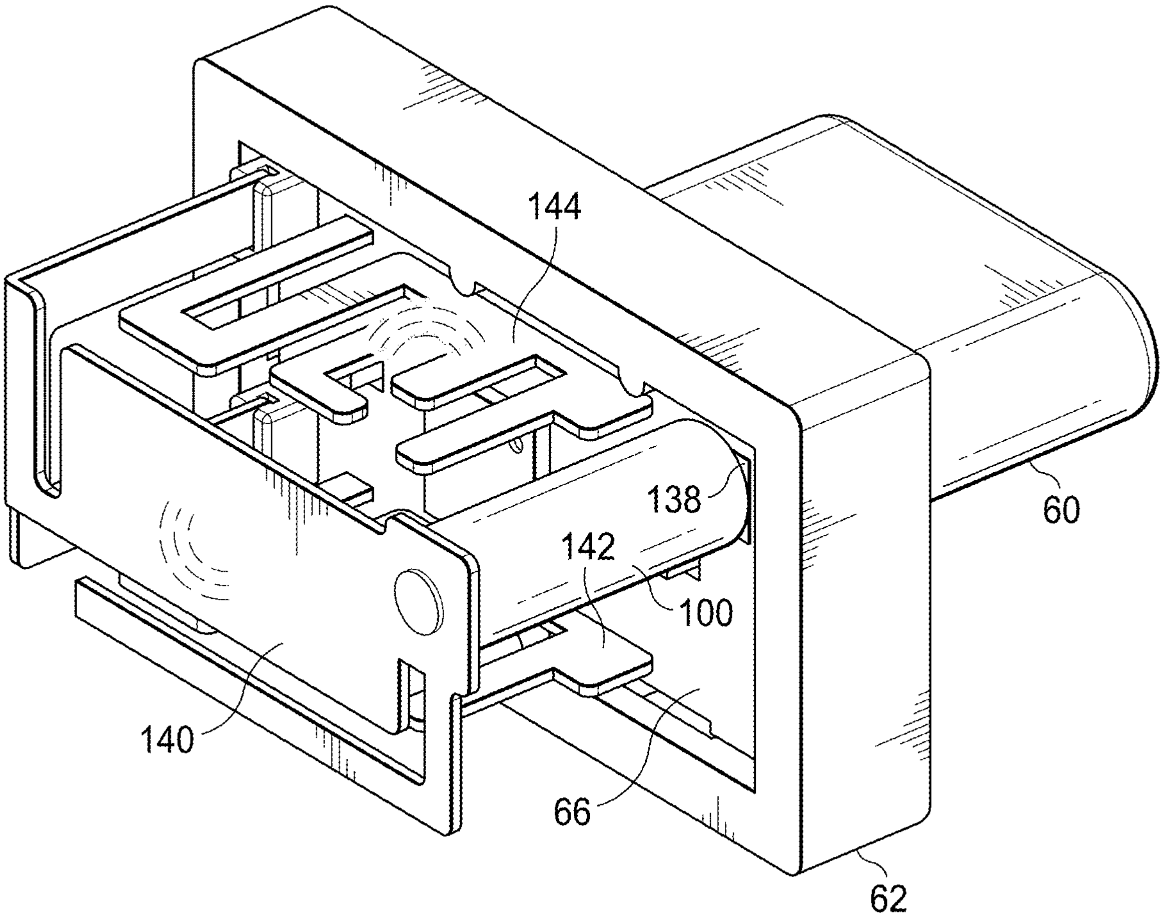
Figure 14B:
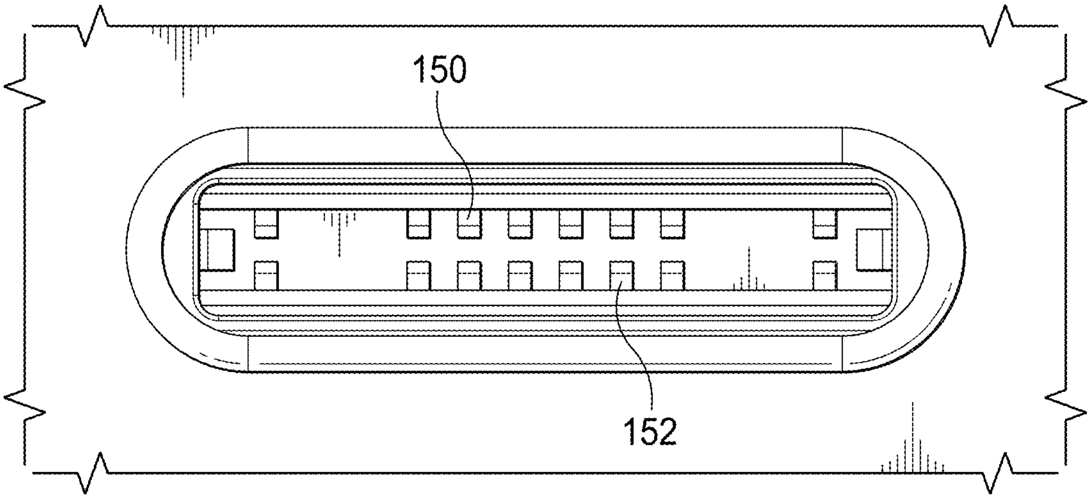
Figure 14B:
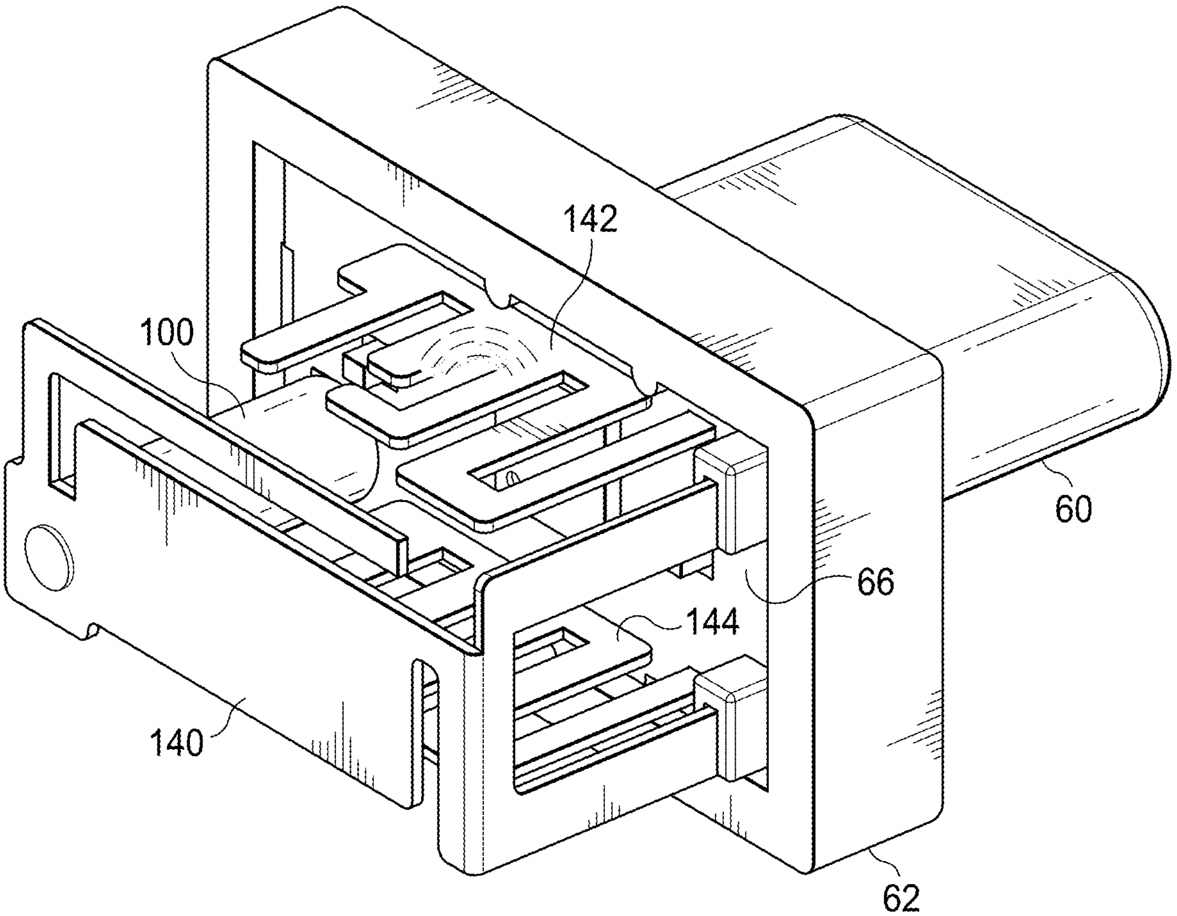

Referring now to FIGS. 14A and 14B, the wireless dongle with three antenna is depicted in opposite orientations that determine which audio antenna transmits to a speaker peripheral. An information handling system that includes a Type C USB port can accept connector 60 in a reversible orientation with connection pins mirrored at the upper and lower side of the port. When connector 60 inserts into a port, CC1 and CC2 pins are detected to determine the orientation of the connector and thus to identify which of the audio antenna are located at a top side and a bottom side of the wireless dongle. In FIG. 14A, antenna 144 is detected by the CC1 150 located at an upper side of the port and CC2 152 located at a lower side of the port. In FIG. 14B, antenna 142 is detected by the CC1 150 located at a lower side of the port and CC2 152 located at an upper side of the port. The detection of the orientation may be performed at the information handling system and then communicated to the wireless dongle, or may be performed with logic on the wireless dongle. Once the upper oriented antenna is determined, the wireless dongle transmits audio signals from that antenna while leaving the lower oriented antenna unused. In one example embodiment, once communication is established with the audio peripheral through the upper oriented antenna, logic on the wireless dongle may transmit a set signal and power level from both the upper and lower antenna so that the audio peripheral can report the received signal strength back to the dongle to ensure that the best signal is provided by the upper antenna. If a better signal is provided by the lower antenna, the wireless dongle may use the lower antenna instead. In one alternative embodiment, the upper and lower antenna may also be selected based upon which introduces the least interference with reception of peripheral information by the I/O antenna. For instance, while audio is transmitted from the audio antenna on the top and bottom, the quality of received signals from the peripheral at the I/O antenna is determined to select the audio antenna which introduces the least interference.

A variety of combinations of the different embodiments disclosed herein support peripherals with the wireless dongle to achieve secure communication in a robust form. As an example, the audio device supported by FIGS. 13 and 14 may include a microphone having primarily reception of audio information instead of transmission for support of an external speaker. In an alternative embodiment, the parallel antenna 142 and 144 may be used as a phased array to direct wireless communications in a desired direction. The orientation of the circuit board may rotate ninety degrees relative to the connector so that the circuit board has a vertical rather than horizontal disposition. The assembly may include the dual circuit boards shown in FIG. 12 with conductive silicon and gold contacts aligned to communicate information between the connector and radio. Although FIG. 12 depicts conductive silicon on the circuit board coupled to the connector and gold contacts on the radio circuit board, the opposite configuration may be used or a combination of gold and conductive silicon contacts may used on both circuit boards. Generally, the antenna are described as having a transmission axis, such along the insertion axis of the connector or up and down relative to the connector; these transmission axes represent the primary transmission zone or lobe of the antenna.

Although the present invention has been described in detail, it should be understood that various changes, substitutions and alterations can be made hereto without departing from the spirit and scope of the invention as defined by the appended claims.

What is claimed is:

1. An information handling system comprising:

a housing having a port;

a processor coupled in the housing and operable to execute instructions that process information;

a memory coupled in the housing and interfaced with the processor, the memory operable to store the instructions and information;

a peripheral external the housing and operable to communicate by wireless signals; and a wireless dongle having a connector configured to insert into the port along an insertion axis, a circuit board coupled to the connector, a radio coupled to the circuit board, the radio operable to communicate with wireless signals to the peripheral, a first antenna interfaced with the circuit board and held in a spaced relationship distal the circuit board, a second antenna coupled to the circuit board and a third antenna coupled to the circuit board, the first antenna configured to transmit along the insertion axis, the second and third antenna configured to transmit orthogonal the insertion axis in opposite directions to each other.

2. The information handling system of claim 1 further comprising:

plural pins disposed in the port, at least one pin associated with a top side of the housing and at least one pin associated with a lower side of the housing;

wherein the second and third antenna selectively activate based at least in part on the orientation of the connector in the port.

3. The information handling system of claim 2 wherein the first antenna comprises a three dimensional form mounted to the circuit board and extending out from the circuit board to have at least a conductive portion in a spaced parallel relationship to the circuit board.

4. The information handling system of claim 3 wherein the circuit board couples to the connector orthogonal to the insertion axis.

5. The information handling system of claim 4 further comprising a pogo pin extending from the first antenna to bias against a contact pad of the circuit board, the contact pad interfaced with the radio.

6. The information handling system of claim 5 wherein:

the first antenna is configured to communicate with an input/output peripheral; and the second and third antenna are configured to communicate with an audio peripheral.

7. The information handling system of claim 6 wherein the input/output peripheral comprises a mouse.

8. The information handling system of claim 7 wherein the input/output peripheral comprises a keyboard.

9. The information handling system of claim 8 wherein the peripheral comprises a speaker.

10. A method for communicating between an information handling system and plural peripherals, the method comprising:

inserting a wireless dongle connector into a port of the information handling system along an insertion axis;

orienting a first antenna orthogonal to the insertion axis;

communicating between the first antenna and a first peripheral with transmissions from the first antenna centered on the insertion axis;

orienting second and third antenna with the insertion axis in a spaced parallel relationship to each other;

detecting based upon pin interfaces between the wireless dongle connector and the port which of the second and third antenna has a top position; and communicating wireless signals between the second peripheral and the second or third antenna having the top position.

11. The method of claim 10 further comprising:

coupling a circuit board orthogonal to the wireless dongle connector insertion axis;

coupling a radio to the circuit board;

coupling the first antenna in a spaced parallel relationship to the circuit board; and coupling the second and third antenna orthogonal to the circuit board.

12. The method of claim 11 further comprising interfacing the first antenna with the circuit board through a pogo pin.

13. The method of claim 12 further comprising:

embedding the first, second and third antenna in a flexible material; and extending a spring biased contact of the pogo pin out of the flexible material and aligned to interface with a contact pad of the circuit board.

14. The method of claim 13 wherein:

the first peripheral comprises a mouse; and the second peripheral comprises a speaker.

15. The method of claim 10 further comprising communicating with the second peripheral through only one of the second and third antenna at a time.

16. The method of claim 10 further comprising adapting the phase of the wireless signals communicated from the second and third antenna to direct a beam of the wireless signals in a predetermined direction.

17. A wireless dongle comprising:

a connector configured to insert into an information handling system port along an insertion axis with an up or down orientation;

a circuit board coupled to the connector;

a radio coupled to the circuit board, the radio operable to communicate with wireless signals;

a first antenna interfaced with the circuit board and aligned to transmit along the insertion axis to a first peripheral;

a second antenna interfaced with the circuit board and aligned to transmit along the up orientation; and a third antenna interfaced with the circuit board and aligned to transmit along the down orientation.

18. The wireless dongle of claim 17 wherein the first antenna comprises a three dimensional metal piece having a planar portion held in a parallel spaced relationship with the circuit board.

19. The wireless dongle of claim 18 wherein the circuit board couples to the connector orthogonal to the connector.

20. The wireless dongle of claim 19 wherein the second and third antenna couple to the circuit board orthogonal to the circuit board and the first antenna.

* * * * *